US008328323B2

(12) United States Patent
Haijima

(10) Patent No.: US 8,328,323 B2
(45) Date of Patent: Dec. 11, 2012

(54) TREATMENT LIQUID, INK SET AND IMAGE FORMING METHOD

(75) Inventor: Akimitsu Haijima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 145 days.

(21) Appl. No.: 13/043,497

(22) Filed: Mar. 9, 2011

(65) Prior Publication Data

US 2011/0227993 A1 Sep. 22, 2011

(30) Foreign Application Priority Data

Mar. 16, 2010 (JP) ................................ 2010-059943

(51) Int. Cl.
*B41J 2/015* (2006.01)
(52) U.S. Cl. .......................................... 347/21; 347/95
(58) Field of Classification Search .................... 347/15, 347/40, 43, 95–100; 106/31.13
See application file for complete search history.

(56) References Cited

U.S. PATENT DOCUMENTS

| 6,811,251 B2 * | 11/2004 | Kinomoto et al. ............ 347/101 |
| 2009/0234067 A1 | 9/2009 | Kariya |
| 2010/0003408 A1 | 1/2010 | Yanagi et al. |
| 2010/0055325 A1 | 3/2010 | Sakai et al. |

FOREIGN PATENT DOCUMENTS

| JP | 2001-001627 A | 1/2001 |
| JP | 2003-341218 A | 12/2003 |
| JP | 2004-010883 A | 1/2004 |

* cited by examiner

*Primary Examiner* — Thinh Nguyen
(74) *Attorney, Agent, or Firm* — SOLARIS Intellectual Property Group, PLLC

(57) ABSTRACT

The present invention provides a treatment liquid including: at least one acidic compound selected from an organic acidic compound or an inorganic acidic compound; and at least one compound selected from a nitrogen-containing heterocyclic compound or an organic mercapto compound; wherein the treatment liquid has a pH of from 0.5 to 2.0 at 25° C. and the ability to aggregate particles dispersed in an ink composition including at least one colorant and particles of at least one polymer.

12 Claims, No Drawings

TREATMENT LIQUID, INK SET AND IMAGE FORMING METHOD

CROSS-REFERENCE TO RELATED APPLICATION

This application claims priority under 35 USC 119 from Japanese Patent Application No. 2010-059943 filed on Mar. 16, 2010, the disclosure of which is incorporated by reference herein.

BACKGROUND OF THE INVENTION

1. Field of the Invention

The present invention relates to a treatment liquid, an ink set, and an image forming method.

2. Description of the Related Art

Various inkjet recording media have been studied, while there has been a demand for techniques capable of forming high-quality images. Various ink materials have also been studied in view of water resistance, light resistance, etc.

For example, pigments are widely used for a colorant that is one of components of the ink material. The pigments, when used, are dispersed in a medium such as water. The important things for use of the pigments in dispersion are, for example, the dispersed particle size, the stability after dispersion, the uniformity of the size, and the ejectability from a discharging head, and various studies on techniques for improving these problems have been made.

In the time in which recording is performed on a standard paper or the like, sometimes, sufficient performance may not be achieved with respect to coloring density or other characteristics such as fixation (such as scratch resistance), resolution, and gloss unevenness. Particularly in order to increase the inkjet recording speed, high-speed recording suitability has been required not of shuttle scan method but of single-pass method, in which recording is possible by a single head operation.

Concerning the related art, there is disclosed an inkjet recording method of recording an image on a recording medium using an ink having a specific ratio of a surface tension to a viscosity, and a liquid composition that has a specific ratio of a surface tension to a viscosity and is capable of forming an aggregate when brought into contact with the ink (see for example Japanese Patent Application Laid-Open (JP-A) No. 2004-10833).

There is also disclosed a reaction liquid that is capable of aggregating an ink composition and contains a polyvalent metal salt, ammonia, and benzotriazole or a benzotriazole derivative in order to achieve good printing quality and a high level of storage stability and discharge stability (see for example JP-A No. 2001-1627).

There is also disclosed a treatment liquid that is capable of aggregating an ink composition and contains resin fine particles and benzotriazole in order to form a high-quality image without causing corrosion of a head component (see for example JP-A No. 2003-341218).

In the inkjet recording method disclosed in JP-A No. 2004-10833, however, aggregability of the ink is insufficient, and the dot diameter stability and the image scratch resistance are also insufficient. The treatment liquid and the reaction liquid disclosed in JP-A No. 2001-1627 and JP-A No. 2003-341218 are not considered to be sufficient in terms of scratch resistance, dot diameter stability, feeding properties of the recording medium in the image formation in a long run, and coating properties of the treatment liquid.

An object of the invention is to provide a treatment liquid that can form an image having a high level of scratch resistance, dot diameter stability, and feeding properties of the recording medium and that has excellent coating properties, in the image formation in a long run.

Another object of the invention is to provide an ink set including an ink composition and a treatment liquid that can form an image having a high level of scratch resistance, dot diameter stability, and feeding properties of the recording medium and that has excellent coating properties, in the image formation in a long run.

A further object of the invention is to provide an image forming method capable of forming an image having a high level of scratch resistance, dot diameter stability, and feeding properties of the recording medium in the image formation in a long run.

SUMMARY OF THE INVENTION

The present invention has been made in view of the above.

A first aspect of the present invention provides a treatment liquid including: at least one acidic compound selected from an organic acidic compound or an inorganic acidic compound; and at least one compound selected from a nitrogen-containing heterocyclic compound or an organic mercapto compound, and the treatment liquid having a pH of from 0.5 to 2.0 at 25° C. and an ability to aggregate particles dispersed in an ink composition including at least one colorant and particles of at least one polymer.

DETAILED DESCRIPTION OF THE INVENTION

Treatment Liquid

The treatment liquid of the present invention contains at least one acidic compound selected from an organic acidic compound and an inorganic acidic compound (hereinafter also referred to simply as "an acidic compound") and at least one compound selected from a nitrogen-containing heterocyclic compound and an organic mercapto compound (hereinafter also referred to as "a compound used in the invention") and has a pH of from 0.5 to 2.0 at 25° C. and an ability to aggregate particles dispersed in an ink composition containing at least one colorant and particles of at least one polymer.

The use of the treatment liquid of this composition makes it possible to form a treatment liquid having excellent coating properties in the image formation in a long run and also makes it possible to form images having a high level of scratch resistance, dot diameter stability, and feeding properties of the inkjet recording medium.

Acidic Compound

The treatment liquid of the invention contains at least one acidic compound selected from an organic acidic compound or an inorganic acidic compound.

The addition of the acidic compound facilitates aggregation of an ink composition and makes it possible to improve the surface profile of the coating of the treatment liquid, to inhibit scratching caused on the formed image, to make dots (particularly, secondary color dots) uniform, and to reduce uneven glossiness. In particular, the addition of the acidic compound is significantly effective in improving the surface profile of the coating of the treatment liquid, inhibiting scratching caused on the formed image, and making dots (particularly, secondary color dots) uniform.

The acidic compound to be used may be freely selected from an organic acidic compound or an inorganic acidic compound. Particularly in view of aggregation speed and inhibition of scratching, an organic acidic compound is preferably used.

Organic Acidic Compound

The organic acidic compound can aggregate an ink composition.

The organic acidic compound may be any organic compound, as long as it has at least one acidic group. Examples of the acidic group include a phosphate group, a phosphonate group, a phosphinate group, a sulfate group, a sulfonate group, a sulfinate group, and a carboxyl group. In an exemplary embodiment of the invention, in view of aggregation speed of the ink composition, the acidic group is preferably a phosphate group or a carboxyl group, more preferably a carboxyl group.

The carboxyl group-containing organic compound (organic carboxylic acid) is preferably selected from polyacrylic acid, acetic acid, glycolic acid, malonic acid, malic acid (preferably, DL-malic acid), maleic acid, ascorbic acid, succinic acid, glutaric acid, fumaric acid, citric acid, tartaric acid, phthalic acid, 4-methylphthalic acid, lactic acid, sulfonic acid, orthophosphoric acid, pyrrolidone carboxylic acid, pyrone carboxylic acid, pyrrole carboxylic acid, furan carboxylic acid, pyridinecarboxylic acid, coumaric acid, thiophencarboxylic acid, nicotinic acid, or a derivative of the above compounds, or a salt thereof (such as a polyvalent metal salt). These compounds may be used singly or in combination of two or more.

In an exemplary embodiment of the invention, in view of aggregation speed of the ink composition, the organic carboxylic acid is preferably a divalent or polyvalent carboxylic acid (hereinafter also referred to as a polyvalent carboxylic acid), more preferably at least one selected from malonic acid, malic acid, maleic acid, succinic acid, glutaric acid, fumaric acid, tartaric acid, 4-methylphthalic acid, and citric acid, even more preferably at least one selected from malonic acid, malic acid, tartaric acid, and citric acid.

Inorganic Acidic Compound

In an exemplary embodiment of the invention, examples of the inorganic acidic compound include, but are not limited to, phosphoric acid, nitric acid, and sulfuric acid.

In view of aggregation speed of the ink composition, phosphoric acid is most preferred among the above inorganic acidic compounds.

In the treatment liquid, the acidic compound may be only an organic or inorganic acidic compound, or a mixture of an organic acidic compound and an inorganic acidic compound. In view of aggregation speed of the ink composition, the treatment liquid preferably contains two or more organic acidic compounds; a combination of one or more organic acidic compounds and one or more inorganic acidic compounds; or one organic acidic compound, more preferably contains two or more acidic compounds, and particularly preferably contains a combination of one or more organic acidic compounds and at least one inorganic acidic compound. Particularly for secondary or higher-order color ink aggregation, the acidic compound is required to efficiently diffuse in the direction in which dots overlap. If the aggregability is too high, the acidic compound can react before it diffuses. To optimize the aggregability and the diffusibility, two or more acidic compounds are preferably used in combination, and the use of one or more organic acidic compounds and one or more inorganic acidic compounds is particularly preferred.

In view of aggregation speed of the ink composition, a total content of the acidic compound(s) is preferably, but not limited thereto, from 5 to 35% by weight, and more preferably from 10 to 30% by weight.

In an exemplary embodiment of the invention, in a case in which an organic acidic compound and an inorganic acidic compound are used in combination, a content ratio (molar ratio) of the organic acidic compound to the inorganic acidic compound is preferably from 10:1 to 1:10, more preferably from 7:1 to 1:7, and particularly preferably from 5:1 to 1:5 by mole, in view of aggregation speed, scratch resistance, dot diameter stability, or feeding properties of the inkjet recording medium.

In a particularly preferred mode, the treatment liquid contains at least two acidic compounds, in which at least one of the acidic compounds can form a calcium salt having a solubility (25° C.) of 0.1 g/100 g or less in water and the at least one of the acidic compounds has a content of 1 to 70% by weight based on a total weight of the acidic compounds, and at least one of other acidic compound(s) is a divalent or polyvalent carboxylic acid.

Also in view of suppressing unevenness of gloss caused on the image section, a content of the acidic compound, which can form a calcium salt having a solubility (25° C., g/100 g water) of 0.1 or less in water, based on a total of acidic compounds is preferably from 1 to 70% by weight, and more preferably from 3 to 50% by weight.

The treatment liquid more preferably contains an acidic compound forming a calcium salt having a solubility of 0.1 or less in water.

If the content is less than 1% by weight, an effect of suppressing the unevenness of gloss becomes relatively small, and a content of more than 70% by weight is not preferred in view of uniformity of dots.

The "solubility" used herein refers to a quantity by weight (g) of the acidic compound that can dissolve in 100 g of water at 25° C. Examples of the calcium salt of an acidic compound having a solubility of 0.1 g/100 g or less in water include the compounds shown below. Calcium phosphate has a solubility of 0.0018, Calcium tartrate has a solubility of 0.0023, and calcium citrate has a solubility of 0.085. Above all, tartaric acid and phosphoric acid are preferred, and phosphoric acid is most preferred. Concerning the solubility of calcium salts of other organic acids, calcium malonate has a solubility of 0.35, and calcium DL-malate has a solubility of 0.92.

Nitrogen-Containing Heterocyclic Compound and Organic Mercapto Compound

The treatment liquid of the invention contains at least one compound (hereinafter also referred to as "a compound used in the invention") selected from a nitrogen-containing heterocyclic compound or an organic mercapto compound, and preferably contains a nitrogen-containing heterocyclic compound in view of scratch resistance or feeding properties of the recording medium.

Nitrogen-Containing Heterocyclic Compound

For example, the nitrogen-containing heterocyclic compound preferably has a nitrogen-containing five- or six-membered ring structure, particularly preferably has a nitrogen-containing five-membered ring.

In particular, the nitrogen-containing five- or six-membered structure preferably represents a nonmetallic atomic group necessary to form a five- or six-membered heterocyclic ring including at least one atom of a carbon atom, a nitrogen atom, an oxygen atom, a sulfur atom, or a selenium atom. The heterocyclic ring may be condensed with an aromatic carbon ring or an aromatic heterocyclic ring.

Examples of the heterocyclic ring include a tetrazole ring, a triazole ring, imidazole ring, a thiadiazole ring, an oxadiazole ring, a selenadiazole ring, an oxazole ring, a thiazole ring, a benzoxazole ring, a benzothiazole ring, a benzimidazole ring, a pyrimidine ring, a triazaindene ring, a tetrazaindene ring, and a pentazaindene ring.

These rings may have a substituent. For example, the ring may be substituted with a nitro group, a halogen atom (e.g., chlorine, and bromine), a mercapto group, a cyano group, an alkyl groups (e.g., methyl, ethyl, propyl, tert-butyl, and cyanoethyl), an aryl group (e.g., phenyl, 4-methanesulfonamidephenyl, 4-methylphenyl, 3,4-dichlorophenyl, and naphthyl), an alkenyl group (e.g., ally), an aralkyl group (e.g., benzyl, 4-methylbenzyl, and phenethyl), a sulfonyl group (e.g., methanesulfonyl, ethanesulfonyl, and p-toluenesulfonyl), a carbamoyl group (e.g., unsubstituted carbamoyl, methylcarbamoyl, and phenylcarbamoyl), a sulfamoyl group (e.g., unsubstituted sulfamoyl, methylsulfamoyl, and phenylsulfamoyl), a carbonamide group (e.g., acetamide and benzamide), a sulfonamide group (e.g., methanesulfonamide, benzenesulfonamide, and p-toluenesulfonamide), an acyloxy group (e.g., acetyloxy and benzoyloxy), a sulfonyloxy group (e.g., methanesulfonyloxy), a ureido group (e.g., unsubstituted ureido, methylureido, ethylureido, and phenylureido), an acyl group (e.g., acetyl and benzoyl), an oxycarbonyl group (e.g., methoxycarbonyl and phenoxycarbonyl), an oxycarbonylamino group (e.g., methoxycarbonylamino, phenoxycarbonylamino, and 2-ethylhexyloxycarbonylamino), which groups may be further substituted or unsubstituted; or a hydroxyl group. A single ring may have plural substituents.

Preferred examples of the nitrogen-containing heterocyclic compound include an imidazole, a benzimidazole, a benzindazole, a benzotriazole, a tetrazole, a benzoxazole, a benzothiazole, a pyridine, a quinoline, a pyrimidine, a piperidine, a piperazine, a quinoxaline, and a morpholine, and these compounds may have a substituent such as an alkyl group, a carboxyl group, or a sulfo group as described above.

The nitrogen-containing six-membered ring compound preferably has a triazine ring, a pyrimidine ring, a pyridine ring, a pyrroline ring, a piperidine ring, a pyridazine ring, or a pyrazine ring. In particular, a compound having a triazine ring or a pyrimidine ring is preferred. These nitrogen-containing six-membered ring compound may have a substituent, which may be an alkyl group having preferably from 1 to 6 carbon atoms, and more preferably 1 to 3 carbon atoms; an alkoxy group having preferably from 1 to 6 carbon atoms, and more preferably from 1 to 3 carbon atoms; a hydroxyl group; a carboxyl group; a mercapto group; an alkoxyalkyl group having preferably from 1 to 6 carbon atoms, and more preferably from 1 to 3 carbon atoms; or a hydroxyalkyl group having preferably from 1 to 6 carbon atoms, and more preferably from 1 to 3 carbon atoms.

Preferred examples of the nitrogen-containing six-membered ring compound include triazine, methyltriazine, dimethyltriazine, hydroxyethyltriazine, pyrimidine, 4-methylpyrimidine, pyridine, and pyrroline.

Organic Mercapto Compound

In an exemplary embodiment of the invention, examples of the organic mercapto compound may be an alkylmercapto compound, an arylmercapto compound and a heterocyclic mercapto compound.

Examples of the alkylmercapto compound include cysteine and thiomalic acid, examples of the arylmercapto compound include thiosalycilic acid, and examples of the heterocyclic mercapto compound include 2-phenyl-1-mercaptotetrazole, 2-mercaptobenzimidazole, 2-mercaptobenzothiazole, 2-mercaptobenzoxazole, 2-mercaptopyrimidine, 2,4-dimercaptopyrimidine, and 2-mercaptopyridine. These compounds may have a substituent such as an alkyl group, a carboxyl group, or a sulfo group.

Among the above compounds, the compound used in the invention is particularly preferably benzotriazole, 5-methylbenzotriazole, 5-aminobenzotriazole, 5-chlorobenzotriazole, tetrazole, 5-aminotetrazole, 5-methyltetrazole, or 5-phenyltetrazole, and most preferably benzotriazole, in view of dot diameter stability and feeding properties after image formation in the image formation in a long run.

The compounds used in the invention may be used singly or in combination of two or more.

The content of the compound used in the invention is preferably, but not limited thereto, a concentration of from 0.0001 to 1.0 mol per liter, more preferably from 0.001 to 0.5 mol per liter, still more preferably from 0.005 to 0.5 mol per liter, still more preferably from 0.01 to 0.5 mol per liter, still more preferably from 0.01 to 0.3 mol per liter, and most preferably from 0.05 to 0.3 mol per liter. If the content is 0.0001 mol/L or more, the effects of the invention can be reliably produced. If the content is 1.0 mol/L or less, precipitation of the undissolved material can be favorably prevented.

Water-Soluable Organic Solvent

The treatment liquid of the invention preferably contains at least one water-soluble organic solvent. The mass ratio of the aqueous organic solvent to the acidic compound may be from 0.15 to 0.70, preferably from 0.20 to 0.60, and more preferably from 0.25 to 0.50.

When the mass ratio of the water-soluble organic solvent to the organic acidic compound is in the above range, a high level of dot diameter stability and scratch resistance can be obtained. Further, in a case in which the treatment liquid is applied by a coating method, coating properties of the treatment liquid is improved so that a uniform coating surface profile can be achieved.

In an exemplary embodiment of the invention, the water-soluble organic solvent may be any organic solvent, as long as it has a solubility of 5 g or more in 100 g of water at 20° C. Specifically, the water-soluble organic solvent that may be incorporated in the ink composition described below may also be used in the treatment liquid. Particularly in view of suppression of curling, the water-soluble organic solvent is preferably polyalkylene glycol or a derivative thereof, and more preferably at least one selected from diethylene glycol monoalkyl ether, triethylene glycol monoalkyl ether, dipropylene glycol, tripropylene glycol monoalkyl ether, polyoxypropylene glyceryl ether, or polyoxyethylene polyoxypropylene glycol.

The content of the water-soluble organic solvent in the treatment liquid is not particularly restricted as long as a content (mass ratio) of it to the acidic compound is in the above range. In view of coating properties, dot diameter stability, or scratch resistance, the content of the water-soluble organic solvent is preferably from 3 to 20% by weight, more preferably from 5 to 15% by weight, based on the total amount of the treatment liquid.

In an exemplary embodiment of the invention, it is preferred that the water-soluble organic solvent is polyalkylene glycol or a derivative thereof and a ratio by mass of polyalkylene glycol or a derivative thereof to organic acidic compound is from 0.15 to 0.70 and the content of polyalkylene glycol or a derivative thereof is form 3 to 20% by mass with respect to a total amount of the treatment liquid. Further, it is more preferred that the ratio by mass of polyalkylene glycol or a derivative thereof to organic acidic compound is from 0.20 to 0.60 and the content of polyalkylene glycol or a derivative thereof is form 5 to 15% by mass with respect to a total amount of the treatment liquid.

According to this feature, the dot diameter stability and the scratch resistance are more effectively improved.

Other Additives

The treatment liquid of the invention may contain other additives in addition to the acidic compound, the compound used in the invention, and the water-soluble organic solvent. Other additives for the treatment liquid may be the same as those for the ink composition described below.

Surfactant

The treatment liquid of the invention may contain at least one surfactant. The surfactant may be used as a surface tension adjusting agent. Such a surface tension adjusting agent may be a nonionic surfactant, a cationic surfactant, an anionic surfactant, a betaine surfactant, or the like.

In particular, a nonionic surfactant or an anionic surfactant is preferred in view of aggregation speed of the ink composition.

The surfactant disclosed in JP-A No. 59-157636, pages 37 to 38, or Research Disclosure No. 308119 (1989) may also be used.

The fluorochemical (fluoroalkyl-series) surfactant or the silicone surfactant disclosed in JP-A No. 2003-322926, 2004-325707 or 2004-309806 may also be used.

A content of the surfactant in the treatment liquid is not particularly limited; however the surfactant is preferably added thereto such that the treatment liquid can have a surface tension of from 30 mN/m or more, more preferably from 35 to 60 mN/m, and still more preferably from 40 to 50 mN/m.

The treatment liquid of the invention may have a surface tension of 30 mN/m or more, preferably from 35 to 60 mN/m, and still more preferably 40 to 50 mN/m at 25° C. The treatment liquid with a surface tension of the above range can more effectively prevent a recording medium from curling.

For example, the surface tension of the treatment liquid may be adjusted by adding a surfactant thereto. The surface tension of the treatment liquid herein used refers to a value measured by a plate method under a condition of 25° C. using Automatic Surface Tensiometer (trade name: CBVP-Z, manufactured by Kyowa Interface Science Co., LTD).

In view of aggregation speed of the ink composition, the treatment liquid of the invention should have a pH of from 0.5 to 2.0 (25±1° C.).

If the treatment liquid has a pH of less than 0.5, the aggregation speed of the ink composition may become so high that uniformity of diameters of primary and secondary color dots may be degraded and that the scratch resistance may be reduced. If the treatment liquid has a pH of more than 2.0, the aggregation speed may become so low that dot coalescence may occur, which results in degradation of graininess.

In particular, the pH is preferably from 0.5 to 1.5.

In view of aggregation speed of the ink composition, a viscosity of the treatment liquid is preferably in the range of from 0.5 to 10 mPa·s, and more preferably in the range of from 1 to 5 mPa·s. The viscosity herein used refers to a value measured under a condition of 25° C. using VISCOMETER TV-22 (trade name, manufactured by TOKI SANGYO CO., LTD).

In view of aggregation speed of the ink composition, white background gloss, dot diameter stability, and scratch resistance of the image, it is preferred that the treatment liquid of the invention contains from 10 to 35% by mass of a divalent or polyvalent carboxylic acid as the organic acidic compound and contains polyalkylene glycol or a derivative thereof as a water-soluble organic solvent in a content (mass ratio) of from 0.15 to 0.70 based on the organic acidic compound.

Further, it is more preferred that the treatment liquid of the invention contains from 15 to 35% by mass of a divalent or polyvalent carboxylic acid as the organic acidic compound and contains polyalkylene glycol or a derivative thereof as a water-soluble organic solvent in a content (mass ratio) of from 0.20 to 0.60 based on the organic acidic compound.

Ink Set

The ink set of the invention includes, as components, an ink composition containing at least one colorant and particles of at least one polymer; and the treatment liquid of the invention.

The ink set of the invention, which includes the ink composition and the treatment liquid of the invention, makes it possible to provide a high level of scratch resistance and dot diameter stability in the image formation in a long run and to form images with a high level of feeding properties of the inkjet-recording medium after image formation.

Ink Composition

In an exemplary embodiment of the invention, the ink composition contains, as components, water, at least one colorant, and particles of at least one polymer, and optionally a water-soluble organic solvent, a surfactant, and other additives.

In an exemplary embodiment of the invention, the ink composition contains water, the amount of which is not particularly restricted. In an exemplary embodiment of the invention, the content of water is preferably from 10 to 99% by mass, more preferably from 30 to 80% by mass, and still more preferably from 50 to 70% by mass.

Colorant

In an exemplary embodiment of the invention, the ink composition contains at least one colorant. The colorant is preferably insoluble in water. The addition of a water-insoluble colorant provides good ink colorability and makes it possible to record visible images with a satisfactory level of color density and hue.

The term "water-insoluble colorant" refers to a colorant that is almost insoluble or sparingly soluble in water and specifically refers to a colorant having a solubility of 0.5% by mass or less in water at 25° C.

Any known dye or pigment may be used as a colorant component without any particular limitation to form the water-insoluble colorant. Examples of the water-insoluble colorant include various pigments, disperse dyes, oil-soluble dyes, and colorants capable of forming J-aggregates, and pigments are more preferred.

In an exemplary embodiment of the invention, a water-insoluble pigment itself or a water-insoluble pigment whose surface is treated with a dispersing agent may be used as the water-insoluble colorant.

The type of the pigment is not particularly limited, and known organic pigments and known inorganic pigments may be used. Examples of pigments include organic pigments, for example, polycyclic pigments such as an azo lake, an azo pigment, a phthalocyanine pigment, a perylene pigment, a perynone pigment, an anthraquinone pigment, a quinacridone pigment, a dioxadine pigment, a diketopyrrolopyrrole pigment, a thioindigo pigment, an isoindolinone pigment and a quinophthalone pigment; dye lakes such as basic dye lakes and acidic dye lakes; and other organic pigments such as a nitro pigment, a nitroso pigment, aniline black and a daylight fluorescent pigment; and inorganic pigments such as titanium oxide, and iron oxide-based pigment and a carbon black-based pigment. Pigments that can be dispersed in an aqueous phase may be used even if they are not described in the Color Index. Further examples of usable pigments include: pigments obtained by subjecting the above-described pigments to surface treatment with a surfactant, a polymer dispersant or the like; and grafted carbon.

Among these pigments, an azo pigment, a phthalocyanine pigment, an anthraquinone pigment, a quinacridone pigment and a carbon black pigment are preferable.

Specific examples of the organic pigments that may be used in the invention are described below.

Examples of organic pigments for orange or yellow include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 151, C.I. Pigment Yellow 155, C.I. Pigment Yellow 180 and C.I. Pigment Yellow 185.

Examples of organic pigments for magenta or red include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222 and C.I. Pigment Violet 19.

Examples of organic pigments for green or cyan include C.I. Pigment Blue 15, C.I. Pigment Blue 15:2, C.I. Pigment Blue 15:3, C.I. Pigment Blue 15:4, C.I. Pigment Blue 16, C.I. Pigment Blue 60, C.I. Pigment Green 7, and aluminum phthalocyanine pigments crosslinked with siloxane such as those described in U.S. Pat. No. 4,311,775.

Examples of organic pigments for black include C.I. Pigment Black 1, C.I. Pigment Black 6 and C.I. Pigment Black 7.

Dispersant

When a pigment is contained as a colorant, the pigment is preferably dispersed in an aqueous solvent by a dispersant. The dispersant may be a polymer dispersant or a low-molecular-weight surfactant-type dispersant. The polymer dispersant may be either a water-soluble dispersant or a water-insoluble dispersant.

With the low-molecular-weight surfactant-type dispersant (hereinafter also referred to as "a low-molecular-weight dispersant"), an organic pigment can be stably dispersed in an aqueous medium, while maintaining the viscosity of the ink at a low level. The low-molecular-weight dispersant is a low-molecular-weight dispersant having a molecular weight of 2,000 or less. The molecular weight of the low-molecular-weight dispersant is preferably from 100 to 2,000, and more preferably from 200 to 2,000.

The low-molecular-weight dispersant has a structure containing a hydrophilic group and a hydrophobic group. The number of the hydrophilic group and the number of the hydrophobic group in a molecule of the dispersant are each independently one or more, and the low-molecular-weight dispersant may have plural kinds of hydrophilic group and/or plural kinds of hydrophobic group. The low-molecular-weight dispersant optionally has a linking group for linking the hydrophilic group and the hydrophobic group.

Examples of the hydrophilic group include an anionic group, a cationic group, a nonionic group, and a betaine group in which the above groups are combined.

The anionic group is not particularly limited as long as the anionic group has a negative charge. The anionic group is preferably a phosphoric acid group, a phosphonic acid group, a phosphinic acid group, a sulfuric acid group, a sulfonic acid group, a sulfinic acid group or a carboxylic acid group, more preferably a phosphoric acid group or a carboxylic acid group, and still more preferably a carboxylic acid group.

The cationic group is not particularly limited as long as the cationic group has a positive charge. The cationic group is preferably an organic cationic substituent, more preferably a cationic group containing a nitrogen or phosphorus atom, and still more preferably a cationic group containing a nitrogen atom. Among those, the cationic group is particularly preferably a pyridinium cation or an ammonium cation.

The nonionic group is not particularly limited as long as the nonionic group does not have a negative or a positive charge. Examples of the nonionic group include polyalkylene oxide, polyglycerin and a sugar unit of a certain kind.

In the present invention, the hydrophilic group is preferably an anionic group from the viewpoint of dispersion stability and aggregation properties of a pigment.

When the low-molecular-weight dispersant has an anionic hydrophilic group, its pKa is preferably 3 or more in terms of promoting aggregation reaction upon contacting with an acidic treatment liquid. The pKa of the low-molecular-weight dispersant as used herein is a value experimentally obtained based on a titration curve that is obtained by titrating a 1 mmol/liter solution of the low-molecular-weight dispersant dissolved in a tetrahydrofuran/water solution (THF:water=3:2, V/V), with an acid or aqueous alkaline solution.

Theoretically, when the pKa of a low-molecular-weight dispersant is 3 or more, 50% or more of anionic groups are in a non-dissociation state when contacted with a treatment liquid having a pH of about 3.5 or less. Therefore, water solubility of the low-molecular-weight dispersant is remarkably decreased, and an aggregation reaction occurs, namely, aggregation reactivity is improved. From this viewpoint, the low-molecular-weight dispersant preferably has a carboxylic group as an anionic group.

On the other hand, the hydrophobic group may have, for example, any of a hydrocarbon structure, a fluorocarbon structure, or a silicone structure, and a hydrocarbon structure is particularly preferable. The hydrophobic group may have a straight-chain structure or a branched structure. The hydrophobic group may have a single-chain structure or a chain structure having two or more chains. When the hydrophobic group has a structure having two or more chains, the structure may have plural kinds of hydrophobic group.

The hydrophobic group is preferably a hydrocarbon group having a carbon number of from 2 to 24, more preferably a hydrocarbon group having a carbon number of from 4 to 24, and still more preferably a hydrocarbon group having a carbon number of from 6 to 20.

When the polymer dispersant is a water-soluble dispersant, examples thereof include a hydrophilic polymer compound. Examples of natural hydrophilic polymer compounds include plant polymers such as gum arabic, gum tragacanth, guar gum, gum karaya, locust bean gum, arabinogalactan, pectin and quince seed starch; algae polymers such as alginic acid, carrageenan and agar; animal polymers such as gelatin, casein, albumin and collagen; and microbial polymers such as xanthene gum and dextran.

Examples of hydrophilic polymer compounds obtained by chemically modifying natural raw materials include cellulose polymers such as methyl cellulose, ethyl cellulose, hydroxyethyl cellulose, hydroxypropyl cellulose and carboxymethyl cellulose; starch polymers such as sodium starch glycolate (sodium salt of starch glycolate), and sodium starch phosphate (sodium salt of starch phosphate[ester]), and algae polymers such as propylene glycol alginate.

Examples of synthetic hydrophilic polymer compounds include vinyl polymers such as polyvinyl alcohol, polyvinyl pyrrolidone and polyvinyl methyl ether; acrylic resins such as polyacrylamide, polyacrylic acid and alkali metal salts thereof, or water-soluble styrene acrylic resins; water-soluble styrene maleic acid resins; water-soluble vinylnaphthalene acrylic resins; water-soluble vinylnaphthalene maleic acid resins; polyvinyl pyrrolidone; polyvinyl alcohol; alkali metal salts of formalin condensates of β-naphthalene sulfonic acid; polymer compounds having, at a side chain, a salt of a cationic functional group such as a quaternary ammonium group or an amino group.

Among those, a polymer compound containing a carboxyl group is preferable from the viewpoint of dispersion stability and aggregation properties of a pigment. Polymer compounds containing a carboxyl group such as the following resins are particularly preferable: acrylic resins such as water-soluble styrene acrylic resins; water-soluble styrene maleic acid resins; water-soluble vinylnaphthalene acrylic resins; and water-soluble vinylnaphthalene maleic acid resins.

Among the polymer dispersants, examples of water-insoluble dispersants include polymers each having both hydrophilic and hydrophobic moieties, such as styrene-(meth)acrylic acid copolymers, styrene-(meth)acrylic acid-(meth)acrylic ester copolymers, (meth)acrylic ester-(meth)acrylic acid copolymers, polyethylene glycol (meth)acrylate-(meth)acrylic acid copolymers, and styrene-maleic acid copolymers.

A weight average molecular weight of the polymer dispersant is preferably from 3,000 to 200,000, more preferably from 5,000 to 100,000, still more preferably from 5,000 to 80,000, and still more preferably from 10,000 to 60,000.

A mixing ratio by mass of a pigment to a dispersant (pigment:dispersant) is preferably in a range of from 1:0.06 to 1:3, more preferably in the range of from 1:0.125 to 1:2, and still more preferably in the range of from 1:0.125 to 1:1.5.

When a dye is used as a colorant, a dye retained on a water-insoluble carrier may be used as a water-insoluble colorant. The dye may be selected from known dyes without particular restrictions, and the dyes described in, for example, JP-A Nos. 2001-115066, 2001-335714, and 2002-249677 may be favorably used in the present invention. The carrier is not particularly limited as long as the carrier is insoluble in water or hardly-soluble in water, and the carrier may be selected from an inorganic material, an organic material, or a composite material thereof. Specifically, the carriers described in, for example, JP-A Nos. 2001-181549 and 2007-169418 may be favorably used in the present invention.

The carrier retaining the dye (water-insoluble colorant) may be used in the form of an aqueous dispersion containing a dispersant. As the dispersant, the above-mentioned dispersants may be favorably used.

In the present invention, the ink composition preferably includes a pigment and a dispersant, more preferably includes an organic pigment and a polymer dispersant, and particularly preferably includes an organic pigment and a polymer dispersant containing carboxyl group, in consideration of the light-fastness, quality, and the like of the image. From the viewpoint of aggregation properties and fixability of an ink, the water-insoluble colorant is especially preferred to be a water-insoluble colorant (preferably a pigment) that is coated with a polymer dispersant (preferably a dispersant containing carboxyl group). It is more preferred that a water-insoluble organic pigment is coated with an acrylic polymer. Examples of the acrylic polymer include acrylic resins such as water-soluble styrene acrylic resins; water-soluble styrene maleic acid resins; water-soluble vinyl naphthalene acrylic resins; and water-soluble vinyl naphthalene maleic acid resins.

From the viewpoint of aggregation properties, it is preferred that the acid value of the polymer dispersant is larger than the acid value of the below-mentioned polymer particles (preferably self-dispersing polymer particles).

An average particle diameter of the colorant is preferably from 10 nm to 200 nm, more preferably from 10 nm to 150 nm, and still more preferably from 10 nm to 100 nm. When the average particle diameter is 200 nm or less, color reproducibility becomes excellent, and jetting properties become excellent when jetting droplets by an inkjet method. When the average particle diameter is 10 nm or more, light-fastness is improved. The particle size distribution of the pigment is not particularly limited, and may be a broad particle size distribution or a monodispersed particle size distribution. It is also possible to use a mixture of two or more pigments having monodispersed particle size distributions.

The average particle diameter and particle size distribution of the colorant refer to values obtained by measuring volume average particle diameters by a dynamic light scattering method, using a NANOTRAC particle size distribution measuring instrument UPA-EX150 (trade name, manufactured by NIKKISO Co., Ltd.).

From the viewpoint of image density, a content of a water-insoluble colorant in the ink composition is preferably from 1 to 25% by mass, more preferably from 2 to 20% by mass, still more preferably from 5 to 20% by mass, and particularly preferably from 5 to 15% by mass, with respect to the ink composition.

The water-insoluble colorant may be used singly or in combination of two or more thereof.

Water-Soluble Organic Solvent

The ink composition of the present invention preferably contains water as a solvent. Preferably, the ink composition further contains at least one water-soluble organic solvent. When the ink composition contains a water-soluble organic solvent, prevention of drying and enhancement of penetration can be achieved. Use of a water-soluble organic solvent as an anti-drying agent can effectively prevent clogging of a nozzle which may otherwise occur due to drying of ink at an ink jetting port when an ink composition is jetted by an inkjet method to record an image.

For prevention of drying, a water-soluble organic solvent having vapor pressure lower than that of water is preferable. Specific examples of the water-soluble organic solvent for prevention of drying include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylolpropane; lower alkyl ethers of a polyhydric alcohol, such as ethylene glycol monomethyl (or ethyl)ether, diethylene glycol monomethyl (or ethyl)ether and triethylene glycol monoethyl (or butyl)ether; heterocycles such as 2-pyrrolidone, N-methyl-2-pyrrolidone, 1,3-dimethyl-2-imidazolidinone and N-ethylmorpholine; sulfur-containing compounds such as sulfolane, dimethylsufoxide and 3-sulfolene; polyfunctional compounds such as diacetone alcohol and diethanolamine; and urea derivatives.

Among them, polyhydric alcohols such as glycerin and diethylene glycol are preferable. The water-soluble organic solvent may be used alone or in combination of two or more thereof. Those hydrophilic organic solvent is preferably contained in an ink composition in an amount of from 10 to 50% by mass with respect to the ink composition.

Further, in order to enhance penetration, a water-soluble organic solvent is suitably used from the viewpoint of improving penetration of an ink composition into a recording medium. Specific examples of a favorable water-soluble organic solvent for enhancing penetration include alcohols, such as ethanol, isopropanol, butanol, di(or tri)ethylene glycol monobutyl ether, and 1,2-hexanediol; sodium lauryl sulfate; sodium oleate; and nonionic surfactants. Favorable effect is obtained when the ink composition contains such a water-soluble organic solvent at a content of from 5 to 30% by mass. The water-soluble organic solvent is preferably used in an addition amount such that bleeding of printed characters and images or print through does not occur.

Other than the above purposes, the water-soluble organic solvent may be used to adjust viscosity. Specific examples of the water-soluble organic solvents that may be used to adjust viscosity include alcohols (for example, methanol, ethanol, propanol, isopropanol, butanol, isobutanol, sec-butanol, t-butanol, pentanol, hexanol, cyclohexanol and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether), amines (for example, ethanolamine, diethanolamine, triethanolamine, N-methyl diethanolamine, N-ethyl diethanolamine, morpholine, N-ethylmorpholine, ethylene diamine, diethylene triamine, triethylene tetramine, polyethylene imine and tetramethylpropylene diamine), and other polar solvents (for example, formaldehyde, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone).

The water-soluble organic solvent may be used alone or in combination of two or more thereof.

Surfactant

The ink composition of the present invention preferably contains at least one surfactant. The surfactant may be used as a surface-tension controller. Examples of the surface-tension controller include nonionic surfactants, cationic surfactants, anionic surfactants, and betaine surfactants.

In the present invention, in view of aggregation speed, the surface-tension controller is preferably anionic surfactants, or nonionic surfactants, and more preferably anionic surfactants.

The ink composition preferably contains surfactant in such an amount that the surface tension of the ink composition is adjusted to be from 25 to 40 mN/m, so as to allow the ink composition to be favorably jetted by an inkjet method. In particular, a content of the surfactant is preferably such an amount that the surface tension is adjusted to be from 27 to 37 mN/m.

Examples of the surfactant include, as hydrocarbon surfactants, anionic surfactants such as fatty acid salts, alkyl sulfates, alkyl benzene sulfonates, alkyl naphthalene sulfonates, dialkyl sulfosuccinates, alkyl phosphates, formalin condensates of naphthalene sulfonates and polyoxyethylene alkyl sulfates; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkyl amines, glycerin fatty acid esters, and oxyethylene-oxypropylene block copolymers. Further, acetylene-type polyoxyethyleneoxide surfactants, such as SURFYNOL series (trade name, manufactured by Air Products & Chemicals, Inc.) are preferably used. Further, amine oxide-type amphoteric surfactants such as N,N-dimethyl-N-alkylamine oxide are also preferable.

Moreover, compounds described as surfactants in JP-A No. 59-157636, pp. 37 to 38 and Research Disclosure No. 308119 (1989) are also applicable.

The anti-abrasion properties can be improved by using fluorochemical (fluoroalkyl-series) surfactants, silicone surfactants or the like, such as those described in JP-A Nos. 2003-322926, 2004-325707 and 2004-309806.

The aforementioned surface-tension controller may also be used as an anti-foam agent, and fluorine compounds, silicone compounds, chelate compounds such as EDTA are applicable.

Polymer Particles

In an exemplary embodiment of the invention, the ink composition contains, as a component, particles of at least one polymer, so that the scratch resistance of the resulting image can be more effectively improved.

In an exemplary embodiment of the invention, for example, the polymer particles may be particles of anionic group-containing resin. Examples of the key resin of the anionic group-containing resin include thermoplastic, thermosetting, or modified acrylic, epoxy, polyurethane, polyether, polyamide, unsaturated polyester, phenolic, silicone, or fluoro resin; polyvinyl resin such as polyvinyl chloride, polyvinyl acetate, polyvinyl alcohol, or polyvinyl butyral; polyester resin such as alkyd resin or phthalic resin; an amino material such as melamine resin, melamine formaldehyde resin, amino alkyd cocondensated resin, or urea-formaldehyde resin; or a copolymer or mixture thereof. Among these polymers, the anionic group-containing acrylic resin is typically obtained by polymerization of an acrylic monomer having an anionic group (an anionic group-containing acrylic monomer) and optionally any other monomer copolymerizable with the anionic group-containing acrylic monomer in a solvent. For example, the anionic group-containing acrylic monomer may be an acrylic monomer having one or more anionic groups selected from the group consisting of a carboxyl group, a sulfonate group and a phosphonate group, preferably a carboxyl group-containing acrylic monomer (such as acrylic acid, methacrylic acid, crotonic acid, ethacrynic acid, propylacrylic acid, isopropylacrylic acid, itaconic acid, or fumaric acid), and still more preferably acrylic acid or methacrylic acid.

In the present invention, the polymer particles are preferably self-dispersing polymer particles, more preferably self-dispersing polymer particles having a carboxyl group, from the viewpoint of jetting stability and stability (particularly, dispersion stability) of the liquid containing the above-described colorant, especially the pigment. The self-dispersing polymer particles refer to particles of a water-insoluble polymer that does not contain a free emulsifier and that can get into a dispersed state in an aqueous medium even in the absence of other surfactants due to a functional group (particularly, an acidic group or a salt thereof) that the polymer itself has.

The scope of the term, "dispersed state", used herein includes an emulsified state (emulsion) in which a water-insoluble polymer in the liquid state is dispersed in an aqueous medium and a dispersed state (suspension) in which a water-insoluble polymer in the solid state is dispersed in an aqueous medium.

The water-insoluble polymer used in the present invention is preferably a water-insoluble polymer that can get into a dispersed state in which the water-insoluble polymer is dispersed in the solid state, in consideration of the coagulation speed and the fixability when the water-insoluble polymer is contained as a component in an ink composition.

The following procedure can be used to determine whether a water-insoluble polymer is a self-dispersing polymer as mentioned herein: 30 g of a water-insoluble polymer is dissolved in 70 g of an organic solvent (such as methyl ethyl ketone) to form a solution, the solution is mixed with 200 g of water and a neutralizing agent that can neutralize the salt-forming groups of the water-insoluble polymer to a degree of 100% (the neutralizing agent being sodium hydroxide if the salt-forming groups are anionic, or acetic acid if the salt-forming groups are cationic), the mixture is stirred with a stirrer having a stirring blade at a rotation rate of 200 rpm at 25° C. for 30 minutes, and the organic solvent is removed from the mixture liquid. If a stable dispersion state of the water-insoluble polymer in the mixture liquid is confirmed by visual observation for at least one week at 25° C. after the removal of the organic solvent, the water-insoluble polymer is considered to be a self-dispersing polymer.

The term "water-insoluble polymer" used herein refers to a polymer that shows a solubility of 10 g or less when the polymer is dried at 105° C. for 2 hours and then dissolved in 100 g of water at 25° C. The solubility is preferably 5 g or less, and more preferably 1 g or less. The solubility mentioned above is a value measured after the polymer is 100% neutralized with either sodium hydroxide or acetic acid depending on the kind of the salt-forming groups of the water-insoluble polymer.

The aqueous medium includes, as a component, water and, optionally, a hydrophilic organic solvent. In the present invention, the aqueous medium is preferably formed by water and a hydrophilic organic solvent whose amount is 0.2% by mass or less with respect to the amount of the water, and is more preferably formed by water only.

The main chain skeleton of the water-insoluble polymer is typically, but not limited to, a vinyl polymer or a condensation polymer (such as epoxy resin, polyester, polyurethane, polyamide, cellulose, polyether, polyurea, polyimide, or polycarbonate). In particular, a vinyl polymer is preferred.

Preferred examples of vinyl polymers and monomers used to form the vinyl polymers include those disclosed in JP-A Nos. 2001-181549 and 2002-88294. Vinyl polymers having a dissociative group at the polymer chain end may also be used, in which the dissociative group is introduced by radical polymerization of a vinyl monomer with a dissociative group (or a substituent convertible into a dissociative group)-containing chain transfer agent or polymerization initiator, or an iniferter or by ionic polymerization using a dissociative group (or a substituent convertible into a dissociative group)-containing compound as any one of an initiator or a terminator.

Preferred examples of a condensation polymer and monomers used to from the condensation polymer include those disclosed in JP-A No. 2001-247787.

In an exemplary embodiment of the invention, the self-dispersible polymer particles preferably contain a water-insoluble polymer including a hydrophilic constituent unit and a constituent unit derived from an aromatic group-containing monomer, in view of self-dispersibility.

The hydrophilic structural unit is not particularly limited as long as it derives from a monomer containing a hydrophilic group. The hydrophilic structural unit may derive from only one type of hydrophilic-group-containing monomer or from two or more types of hydrophilic-group-containing monomer. The hydrophilic group is not particularly limited, and may be a dissociative group or a nonionic hydrophilic group.

In the present invention, the hydrophilic group is preferably a dissociative group, and more preferably an anionic dissociative group, from the viewpoints of enhancing self-dispersibility and providing stability of the formed emulsion or dispersion state. The dissociative group may be, for example, a carboxyl group, a phosphoric acid group, or a sulfonic acid group. In particular, a carboxyl group is preferable as the dissociative group, in consideration of the fixability of an ink composition containing the self-dispersing polymer particles.

The hydrophilic-group-containing monomer in the present invention is preferably a monomer containing a dissociative group, and more preferably a monomer containing a dissociative group and an ethylenic unsaturated bond, in consideration of self-dispersibility and aggregation property.

The dissociative-group-containing monomer may be, for example, an unsaturated carboxylic acid monomer, an unsaturated sulfonic acid monomer, or an unsaturated phosphoric acid monomer Specific examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid.

Specific examples of the unsaturated sulfonic acid monomer include styrenesulfonic acid, 2-acrylamide-2-methylpropane sulfonic acid, 3-sulfopropyl (meth)acrylate, and bis-(3-sulfopropyl) itaconate.

Examples of the unsaturated phosphoric acid monomer include vinyl phosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate.

Among the above dissociative-group-containing monomers, unsaturated carboxylic acid monomers are preferable, and acrylic acid and methacrylic acid are more preferable, in consideration of dispersion stability and jetting stability.

The self-dispersing polymer particles in the present invention preferably contains a polymer having a carboxyl group, and more preferably contains a polymer having a carboxylic group and having an acid value (mgKOH/g) of from 25 to 100, from the viewpoints of self-dispersibility and the aggregation speed when the ink composition containing the polymer particles is in contact with the treatment liquid. The acid value is more preferably from 25 to 80, and particularly preferably from 30 to 65, from the viewpoints of self-dispersibility and the aggregation speed when the ink composition containing the polymer particles is in contact with the treatment liquid.

In particular, when the acid value is 25 or more, the stability of the self-dispersibility becomes favorable, and when the acid value is 100 or less, the aggregation property is improved.

The aromatic-group-containing monomer is not particularly limited as long as the monomer is a compound containing an aromatic group and a polymerizable group. The aromatic group may be a group derived from an aromatic hydrocarbon or from an aromatic heterocycle. In the present invention, the aromatic group is preferably an aromatic group derived from an aromatic hydrocarbon, from the viewpoint of improving the stability of the particle shape in an aqueous medium.

The polymerizable group may be a condensation-polymerizable group or an addition-polymerizable group. In the present invention, the polymerizable group is preferably an addition-polymerizable group, and more preferably a group containing an ethylenic unsaturated bond, from the viewpoint of improving the stability of the particle shape in an aqueous medium.

The aromatic-group-containing monomer in the present invention is preferably a monomer having an aromatic group derived from an aromatic hydrocarbon and an ethylenic unsaturated bond. The aromatic-group-containing monomer may be used singly or in combination of two or more thereof.

Examples of the aromatic-group-containing monomer include phenoxyethyl (meth)acrylate, benzyl (meth)acrylate, phenyl (meth)acrylate, and a styrene-based monomer. In particular, from the viewpoint of improving the balance between the hydrophilicity and hydrophobicity of the polymer chain and ink fixability, an aromatic-group-containing (meth)acrylate monomer is preferable, and at least one monomer selected from phenoxyethyl (meth)acrylate, benzyl (meth)acrylate, or phenyl (meth)acrylate is more preferable, and phenoxyethyl (meth)acrylate and benzyl (meth)acrylate are still more preferable.

The term "(meth)acrylate" used herein refers to acrylate or methacrylate.

In the present invention, the self-dispersing polymer is preferably a (meth)acrylic polymer containing a structural unit derived from an aromatic-group-containing (meth)acrylate monomer at a content of from 10 to 95% by mass in terms of the aromatic-group-containing (meth)acrylate monomer. When the content of the aromatic-group-containing (meth) acrylate monomer is from 10 to 95% by mass, stability of self-emulsification or dispersion state is improved, and, further, an increase in the ink viscosity can be suppressed.

In the present invention, the content of the structural unit derived from the aromatic-group-containing (meth)acrylate monomer is more preferably from 15 to 90% by mass, still more preferably from 15 to 80% by mass, and particularly preferably from 25 to 70% by mass, from the viewpoints of improving stability of the self-dispersing state, stabilizing the particle shape in an aqueous medium through hydrophobic interaction between aromatic rings, and reducing the amount of water-soluble components by imparting appropriate hydrophobicity to the particles.

In the present invention, the self-dispersing polymer may include, for example, a structural unit derived from an aromatic-group-containing monomer and a structural unit derived from a dissociative-group-containing monomer. The self-dispersing polymer may further include another structural unit, as necessary.

The monomer for forming the another structural unit is not particularly limited as long as the monomer is copolymerizable with the aromatic-group-containing monomer and the dissociative-group-containing monomer. In particular, an alkyl-group-containing monomer is preferable from the viewpoint of flexibility of the polymer skeleton and ease in regulating the glass transition temperature (Tg).

Examples of the alkyl-group-containing monomer include alkyl (meth)acrylates such as methyl (meth)acrylate, ethyl (meth)acrylate, isopropyl (meth)acrylate, n-propyl (meth) acrylate, n-butyl (meth)acrylate, isobutyl (meth)acrylate, t-butyl (meth)acrylate, hexyl (meth)acrylate, and ethylhexyl (meth)acrylate; ethylenic unsaturated monomers each having a hydroxyl group such as hydroxymethyl (meth)acrylate, 2-hydroxyethyl (meth)acrylate, 2-hydroxypropyl (meth) acrylate, 4-hydroxybutyl (meth)acrylate, hydroxypentyl (meth)acrylate, and hydroxyhexyl (meth)acrylate; dialkylaminoalkyl (meth)acrylates such as dimethylaminoethyl (meth)acrylate; and (meth)acrylamides such as N-hydroxyalkyl (meth)acrylamides (such as N-hydroxymethyl (meth) acrylamide, N-hydroxyethyl (meth)acrylamide, and N-hydroxybutyl (meth)acrylamide) and N-alkoxyalkyl (meth) acrylamides (such as N-methoxymethyl (meth)acrylamide, N-ethoxymethyl (meth)acrylamide, N-(n-, iso)butoxymethyl (meth)acrylamide, N-methoxyethyl (meth)acrylamide, N-ethoxyethyl (meth)acrylamide, and N-(n-, iso)butoxyethyl (meth)acrylamide).

The molecular weight of the water-insoluble polymer forming the self-dispersing polymer particles is preferably from 3,000 to 200,000, more preferably from 5,000 to 150,000, and still more preferably from 10,000 to 100,000, in terms of weight average molecular weight. When the weight average molecular weight is 3,000 or more, the amount of water-soluble component can be effectively set to a small amount. When the weight average molecular weight is 200,000 or less, the stability of the self-dispersibility can be improved.

The weight average molecular weight is measured with a gel permeation chromatography (GPC). A GPC instrument, HLC-8220GPC manufactured by Tosoh Corporation, is used; the columns (three in number) to be used are TSKGEL SUPER MULTIPORE HZ-H (manufactured by Tosoh Corporation, 4.6 mmID×15 cm); and THF (tetrahydrofuran) is used as an eluent. Regarding the GPC conditions, the sample concentration is 0.35% by mass, the flow rate is 0.35 ml/min, the sample injection amount is 10 µl, and the measurement temperature is 40° C. The detection is performed by using a RI (Refractive Index) detector. The calibration curve is determined from the following eight samples: standard samples TSK STANDARD POLYSTYRENE of F-40, F-20, F-4, F-1, A-5000, A-2500, A-1000, and n-propylbenzene, all manufactured by Tosoh Corporation.

When the water-insoluble polymer forming the self-dispersing polymer particles contains a structural unit derived from an aromatic-group-containing (meth)acrylate monomer (preferably a structural unit derived from phenoxyethyl (meth)acrylate and/or a structural unit derived from benzyl (meth)acrylate), a copolymerization ratio of the structural unit derived from an aromatic-group-containing (meth)acrylate monomer is preferably from 15 to 80% by mass with respect to a total mass of the self-dispersing polymer particles, from the viewpoint of regulating the hydrophilicity/hydrophobicity of the polymer.

From the viewpoint of regulating the hydrophilicity/hydrophobicity of the polymer, the water-insoluble polymer preferably includes a structural unit derived from an aromatic-group-containing (meth)acrylate monomer at a copolymerization ratio of from 15 to 80% by mass, a structural unit derived from a carboxyl group-containing monomer, and a structural unit derived from an alkyl-group-containing monomer (preferably a structural unit derived from a (meth)acrylic ester of an alkyl), and more preferably includes a structural unit derived from phenoxyethyl (meth)acrylate and/or a structural unit derived from benzyl (meth)acrylate at a total copolymerization ratio of from 15 to 80% by mass, a structural unit derived from a carboxyl group-containing monomer, and a structural unit derived from an alkyl-group-containing monomer (preferably a structural unit derived from (meth)acrylic ester of an alkyl having 1 to 4 carbon atoms); further in addition to the above-described preferable embodiments, it is preferable that the acid value of the water-insoluble polymer is from 25 to 100 (mg KOH/g) and the weight average molecular weight of the water-insoluble polymer is from 3,000 to 200,000, and it is more preferable that the acid value is from 25 to 95 (mg KOH/g) and the weight average molecular weight is from 5,000 to 150,000.

Exemplary compounds B-01 to B-19 are shown below, which are examples of the water-insoluble polymer forming the self-dispersing polymer particles. However, the present invention is not limited thereto. The numbers in the parentheses indicate mass ratios of copolymerization components.

B-01: phenoxyethyl acrylate/methyl methacrylate/acrylic acid copolymer (50/45/5)

B-02: phenoxyethyl acrylate/benzyl methacrylate/isobutyl methacrylate/methacrylic acid copolymer (30/35/29/6)

B-03: phenoxyethyl methacrylate/isobutyl methacrylate/methacrylic acid copolymer (50/44/6)

B-04: phenoxyethyl acrylate/methyl methacrylate/ethyl acrylate/acrylic acid copolymer (30/55/10/5)

B-05: benzyl methacrylate/isobutyl methacrylate/methacrylic acid copolymer (35/59/6)

B-06: styrene/phenoxyethyl acrylate/methyl methacrylate/acrylic acid copolymer (10/50/35/5)

B-07: benzyl acrylate/methyl methacrylate/acrylic acid copolymer (55/40/5)

B-08: phenoxyethyl methacrylate/benzyl acrylate/methacrylic acid copolymer (45/47/8)

B-09: styrene/phenoxyethyl acrylate/butyl methacrylate/acrylic acid copolymer (5/48/40/7)

B-10: benzyl methacrylate/isobutyl methacrylate/cyclohexyl methacrylate/methacrylic acid copolymer (35/30/30/5)

B-11: phenoxyethyl acrylate/methyl methacrylate/butyl acrylate/methacrylic acid copolymer (12/50/30/8)

B-12: benzyl acrylate/isobutyl methacrylate/acrylic acid copolymer (93/2/5)

B-13: styrene/phenoxyethyl methacrylate/butyl acrylate/acrylic acid copolymer (50/5/20/25)

B-14: styrene/butyl acrylate/acrylic acid copolymer (62/35/3)

B-15: methyl methacrylate/phenoxyethyl acrylate/acrylic acid copolymer (45/51/4)

B-16: methyl methacrylate/phenoxyethyl acrylate/acrylic acid copolymer (45/49/6)

B-17: methyl methacrylate/phenoxyethyl acrylate/acrylic acid copolymer (45/48/7)

B-18: methyl methacrylate/phenoxyethyl acrylate/acrylic acid copolymer (45/47/8)

B-19: methyl methacrylate/phenoxyethyl acrylate/acrylic acid copolymer (45/45/10)

The method of producing the water-insoluble polymer forming the self-dispersing polymer particles in the present invention is not particularly limited, and may be a method including performing emulsion polymerization in the presence of a polymerizable surfactant so as to covalently bond the surfactant to the water-insoluble polymer or a method including copolymerizing a monomer mixture containing the hydrophilic-group-containing monomer and the aromatic-group-containing monomer by a known polymerization process such as a solution polymerization method or a bulk polymerization method. Among the above polymerization methods, a solution polymerization is preferable, and a solution polymerization method using an organic solvent is more preferable, in consideration of aggregation speed and jetting stability of an ink composition containing the self-dispersing polymer particles.

From the viewpoint of aggregation speed, the self-dispersing polymer particles in the present invention preferably includes a polymer synthesized in an organic solvent, wherein the polymer has carboxyl groups, the carboxyl groups of the polymer being partially or wholly neutralized (to give an acid value of preferably from 20 to 100), and the polymer is prepared in the form of a polymer dispersion in which water constitutes the continuous phase. In other words, the production of the self-dispersing polymer particles in the present invention preferably includes a step of synthesizing a polymer in an organic solvent and a dispersing step of forming an aqueous dispersion in which the carboxyl groups of the polymer are at least partially neutralized.

The dispersion step preferably includes the following substeps (1) and (2):

Substep (1): a step of stirring a mixture containing a polymer (water-insoluble polymer), an organic solvent, a neutralizing agent, and an aqueous medium Substep (2): a step of removing the organic solvent from the mixture The substep (1) is preferably a process in which the polymer (water-insoluble polymer) is dissolved in the organic solvent, and then the neutralizing agent and the aqueous medium are gradually added to the polymer solution and mixed, by stirring, with the polymer solution to form a dispersion. When the neutralizing agent and the aqueous medium are added to the water-insoluble polymer solution in which the water-insoluble polymer is dissolved in the organic solvent as in the above process, self-dispersing polymer particles whose diameter is highly stable during storage can be obtained without requiring a strong shearing force.

The method of stirring the mixture is not particularly limited, and may be a method using a generally-used mixing and stirring apparatus and/or, if necessary, a disperser such as an ultrasonic disperser or a high-pressure homogenizer.

Preferable examples of the organic solvent described above include an alcohol solvent, a ketone solvent and an ether solvent.

Examples of the alcohol solvent include isopropyl alcohol, n-butanol, t-butanol, and ethanol. Examples of the ketone solvent include acetone, methyl ethyl ketone, diethyl ketone, and methyl isobutyl ketone. Examples of the ether solvent include dibutyl ether and dioxane. Among the above solvents, ketone solvents such as methyl ethyl ketone and alcohol solvents such as isopropyl alcohol are preferable. It is also preferable to use isopropyl alcohol and methyl ethyl ketone together for the purpose of making milder the polarity change at the time of phase inversion from an oil phase to an aqueous phase; using the solvents together makes it possible to obtain self-dispersing polymer particles having a very small particle diameter that are free from aggregation precipitation or adhesion between the particles and that have high dispersion stability.

The neutralizing agent is used to partially or wholly neutralize the dissociative groups of the polymer so as to allow the self-dispersing polymer particles to get into a stable emulsion or dispersion state in water. When the self-dispersing polymer in the present invention has an anionic dissociative group (e.g., a carboxyl group) as a dissociative group, the neutralizing agent to be used may be a basic compound such as an organic amine compound, ammonia, or an alkali metal hydroxide. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and triisopropanolamine. Examples of the alkali metal hydroxide include lithium hydroxide, sodium hydroxide and potassium hydroxide. Among them, sodium hydroxide, potassium hydroxide, triethylamine, and triethanolamine are preferable from the viewpoint of dispersion stability of the self-dispersing polymer particles of the present invention in water.

The amount of the basic compound to be used is preferably from 5 to 120 mol %, more preferably from 10 to 110 mol %, and still more preferably from 15 to 100 mol %, with respect to 100 mol % of the dissociative group. When the amount of the basic compound is 15 mol % or more, an effect of stabilizing the dispersion of the particles in water can be most effectively obtained. When the amount of the basic compound is 100 mol % or less, an effect of decreasing the amount of the water-soluble component can be most effectively obtained.

In the substep (2), the organic solvent is removed from the dispersion obtained in the substep (1) using a common method such as distillation under reduced pressure, whereby phase inversion into an aqueous system occurs and an aqueous dispersion of the self-dispersing polymer particles is obtained. The organic solvent has substantially been removed from the obtained aqueous dispersion, and the amount of the remaining organic solvent is preferably 0.2% by mass or less, and more preferably 0.1% by mass or less.

The average particle diameter of the polymer particles (particularly, self-dispersing polymer particles) is preferably in the range of from 10 nm to 400 nm, more preferably in the range of from 10 nm to 200 nm, still more preferably from 10 nm to 100 nm, particularly preferably from 10 nm to 50 nm, in terms of volume average particle diameter. When the volume average particle diameter is 10 nm or more, the suitability for production is improved. When the volume average particle diameter is 400 nm or less, storage stability is improved.

The particle size distribution of the polymer particles is not particularly limited, and may be a broad particle size distribution or a mono-dispersed particle size distribution. It is possible to use a mixture of two or more types of water-insoluble particles.

The volume average particle diameter and particle size distribution of the polymer particles is obtained by measuring the diameters of the particles by a dynamic light scattering method using Nanotrac particle size distribution measuring instrument UPA-EX150 manufactured by Nikkiso Co., Ltd.

The content of the polymer particles (particularly, self-dispersing polymer particles) in the ink composition is preferably from 1 to 30% by mass, and more preferably from 5 to 15% by mass, with respect to the mass of the ink composition, from the viewpoint of image gloss and the like.

It is possible to use one type of polymer particles (particularly, self-dispersing polymer particles) or a mixture of two or more types of polymer particles (particularly, self-dispersing polymer particles).

Other Additives

The ink composition used in the present invention may further include other additives in addition to the aforementioned components, such as known additives including an anti-fading agent, an emulsion stabilizer, a penetration enhancing agent, a UV absorber, an antiseptic agent, an anti-mildew agent, a pH adjuster, an anti-foam agent, a viscosity adjuster, a dispersant, a dispersion stabilizer, an antirust agent and a chelating agent. These additives may be added directly to the ink composition after the preparation of the ink composition. Alternatively, these additives may be added during the preparation of the ink composition.

The incorporation of the UV absorber improves the storability of an image, and examples of the UV absorber include: benzotriazole compounds such as those described in JP-A Nos. 58-185677, 61-190537, 2-782, 5-197075 and 9-34057; benzophenone compounds such as those described in JP-A Nos. 46-2784, and 5-194483 and U.S. Pat. No. 3,214,463; cinnamic compounds such as those described in Japanese Patent Publication Nos. 48-30492 and 56-21141 and JP-A No. 10-88106; triazine compounds such as those described in JP-A Nos. 4-298503, 8-53427, 8-239368, 10-182621 and 8-501291; compounds described in Research Disclosure No. 24239; and so-called fluorescent brighteners that emit fluorescent light upon absorption of UV rays, such as stilbene compounds and benzoxazole compounds.

Incorporation of anti-fading agent improves the storability of an image, and examples thereof include an organic anti-fading agent and a metal complex anti-fading agent. Examples of the organic anti-fading agent include hydroquinones, alkoxyphenols, dialkoxyphenols, phenols, anilines, amines, indanes, chromanes, alkoxyanilines and heterocyclic compounds. Examples of the metal complex anti-fading agent include nickel complexes and zinc complexes. More specifically, examples of usable anti-fading agents include those described in the patents cited in Research Disclosure No. 17643, Section VII, Items Ito J; Research Disclosure No. 15162; Research Disclosure No. 18716, page 650, left column; Research Disclosure No. 36544, page 527; Research Disclosure No. 307105, page 872; and compounds within the scope of the chemical formulae and examples of representative compounds described in pages 127 to 137 of JP-A No. 62-215272.

Examples of the anti-mildew agents include sodium dehydroacetate, sodium benzoate, sodium pyridinethion-1-oxide, ethyl p-hydroxybenzoate, 1,2-benzoisothiazolin-3-one, and salts thereof. The content of the anti-mildew agent in the ink composition is preferably from 0.02 to 1.00 mass %.

Examples of the pH adjuster include a neutralizer such as an organic base or an inorganic alkali. The pH adjuster is preferably added such that the pH of the ink composition becomes a value of from 6 to 10, more preferably from 7 to 10, with a view to improving the storability of the ink composition.

The viscosity of the ink composition of the present invention is preferably in the range of from 1 to 30 mPa·s, more preferably from 1 to 20 mPa·s, still more preferably from 2 to 15 mPa·s, especially preferably from 2 to 10 mPa·s, from the viewpoint of improving the jetting stability when jetted by an inkjet method and the coagulation speed when contacted with the treatment liquid of the present invention.

The viscosity of the ink composition is measured using a VISCOMETER TV-22 (manufactured by TOKI SANGYO CO. LTD) at 25° C.

Image Forming Method

The image forming method of the present invention including: a treatment liquid-applying step of applying the treatment liquid of the present invention to a recording medium, and an ink-applying step of applying an ink composition to the recording medium to form an image.

Treatment-Liquid Applying Step

The treatment-liquid applying step is a step in which the above-described treatment liquid is applied to the recording medium, wherein the treatment liquid is capable of causing formation of an aggregate when brought into contact with the ink composition. The treatment-liquid applying step may include forming an image by allowing the ink composition and the treatment liquid to contact each other. In this process, when the treatment liquid contacts, for example, the ink composition containing pigment particles, dispersed particles, including the pigment particles, in the ink composition aggregate whereby the image is fixed on the recording medium.

Details and preferred embodiments of the treatment liquid are as described above.

Application of the treatment liquid can be performed using a known method, such as a coating method, an inkjet method, or an immersion method. The coating method may be a known coating method using a bar coater, an extrusion die coater, an air doctor coater, a blade coater, a rod coater, a knife coater, a squeeze coater, a reverse roll coater, or the like. Details of the inkjet method are described below.

In the roller coating, the treatment liquid may be applied to the surface of a recording medium using a coating roller immediately before ink drawing on the recording medium, so that the treatment liquid can be applied onto the recording medium.

The coating roller is not particularly restricted, and for example, the roller coating may be performed using a liquid coating apparatus having the structure shown in FIG. 7 of JP-A No. 2009-61645. Subsequently, image formation may be performed, for example, using an inkjet recording apparatus equipped with the liquid coating apparatus having the structure shown in FIG. 1 of the same publication.

With respect to the range in which a treatment liquid is applied, there may be a whole application of applying the treatment liquid to a whole range of a recording medium, or alternatively a partial application of partially applying the treatment liquid to a partial region of the recording medium on which inkjet recording is to be performed in the ink-applying step. In the invention, the whole application is preferred in which the treatment liquid is applied to the whole coated paper using a coating roller or any other means in consideration that the amount of the application of the treatment liquid can be uniformly controlled, thin lines and details of the image or the like can be uniformly recorded, and density unevenness such as image unevenness can be suppressed.

For example, the method of applying the treatment liquid in such a manner that the amount of the application of the treatment liquid can be controlled in the above range may be a method using an anilox roller. The anilox roller is a roller having a ceramic spray coating whose surface is formed in a pyramidal pattern, an oblique line pattern, a hexagonal pattern, or any other pattern by laser processing. The treatment liquid, which enters dents formed on the surface of the roller, is transferred to the surface of a recording paper when brought into contact therewith, so that the treatment liquid is applied in an amount regulated by means of the dents of the anilox roller.

The treatment-liquid applying step may be performed before or after the ink applying step using the ink composition. In the present invention, it is preferable to perform the ink applying step after the treatment liquid is applied in the treatment-liquid applying step. Specifically, in a preferable embodiment, the treatment liquid for aggregating a colorant (preferably a pigment) in the ink composition is applied to the recording medium prior to applying the ink composition, and the ink composition is applied so as to come into contact with the treatment liquid provided on the recording medium, whereby an image is formed. As a result, inkjet recording can be performed at higher speed, and an image having high density and high resolution is obtained even when recording is performed at high speed.

In the present invention, a heat-drying step of drying a treatment liquid on a recording medium by heating may be performed after the application of the treatment liquid to the recording medium but before application of an ink composition. By drying the treatment liquid by heating prior to the ink applying step, ink receiving properties, including suppression of bleed, are improved, and a visible image having good color density and hue can be recorded.

The drying by heating may be performed according to a known heating method using a heater or the like, or an air-blowing method involving air blowing such as a drier, or a method in which these methods are combined. Examples of the heating method include: a method of supplying heat from the side of the recording medium opposite to the surface to which the treatment liquid has been applied, using a heater or the like; a method of blowing a warm or hot air to the surface of the recording medium to which the treatment liquid has been applied; a heating method using an infrared heater; and a combination of two or more of the above methods.

Ink Applying Step

In the ink applying step, the above-described ink composition is applied to a recording medium to form an image. The method of applying an ink composition to the recording medium provided with a treatment liquid is not particularly limited; especially, an inkjet recording method is preferred in view of advantages such as a simple printing mechanism and a reduced noise.

In this step, the ink composition can be selectively applied to the recording medium, so that a desired visible image can be formed. Details of the ink composition are as described above.

The inkjet method is not particularly limited and may be any known method such as a charge-control method in which ink is jetted by electrostatic attraction force; a drop-on-demand method (pressure-pulse method) in which a pressure of oscillation of a piezo element is utilized; an acoustic inkjet method in which ink is jetted by radiation pressure generated by irradiating an ink with acoustic beams that have been converted from electric signals; and a thermal inkjet method in which ink is jetted by a pressure generated by formation of bubbles caused by heating of ink (BUBBLE-JET, registered trademark). An inkjet method described in JP-A No. 54-59936 can be favorably used; in this method, ink is jetted from a nozzle by an acting force generated by a rapid change in volume of the ink caused by application of a thermal energy to the ink.

Further, examples of the inkjet method include a method in which a large number of small-volume droplets of an ink having a low optical density, which is called a photo ink, are jetted; a method in which inks of substantially the same color hue at different densities are used to improve image quality; and a method in which a clear and colorless ink is used.

The inkjet head used in an inkjet method may be either an on-demand type head or a continuous type head. Examples of jetting systems include electromechanical transduction systems (such as a single-cavity system, a double-cavity system, a vendor system, a piston system, a share-mode system and a shared-wall system), electrothermal transduction systems (such as a thermal inkjet system and a BUBBLE-JET (registered trademark) system), electrostatic suction systems (such as an electric-field-control system and a slit-jet system), and discharge systems (such as a spark jet system), and any of these jetting systems is applicable.

The ink nozzles and the like used for the inkjet recording are not particularly limited, and may be selected as appropriate according to applications.

Regarding the inkjet recording head, there are (i) a shuttle system in which recording is performed while a short serial head having a small length is moved in the width direction of a recording medium in a scanning manner, and (ii) a line system in which a line head having recording devices that are aligned correspondingly to the entire length of one side of a recording medium is used. In the line system, image recording can be performed over the whole of one surface of a recording medium by moving the recording medium in a direction orthogonal to the direction along which the recording devices are aligned, and a conveyance system, such as carriage, which moves the short head in a scanning manner is unnecessary. Since a complicated scan-movement control of the movement of the carriage and the recording medium is unnecessary and only the recording medium is moved, the recording speed can be increased compared to the shuttle system. The inkjet recording method of the present invention can be applied to both of these systems; effects in improving the jetting accuracy and rubbing resistance of an image are larger when the inkjet recording method of the present invention is applied to a line system, in which dummy jetting is not generally performed.

In an exemplary embodiment of the invention, the step of applying ink is preferably started within the range of from 0.1 seconds to 10 seconds after the step of applying the treatment liquid, which allows high-speed image formation. In the image-forming method of the invention, the use of the above ink set for inkjet recording makes it possible to suppress impact interference and to form a high definition image even in high-speed image recording.

The expression "started within the range of from 0.1 seconds to 10 seconds after the step of applying the treatment liquid" herein used means that the time from the end of both the application and drying of the treatment liquid to deposition of a first ink droplet on the recording medium is from 0.1 seconds to 10 seconds.

Recording Medium

According to the inkjet recording method of the present invention, an image is recorded on a recording medium.

The recording medium is not particularly limited, and may be a cellulose-based general printing paper, such as high-quality paper, coat paper, or art paper, which is used for general offset printing and the like. When image recording is performed on the cellulose-based general printing paper by a general inkjet method using an aqueous ink, absorption and drying of the ink is relatively slow, colorant migration is likely to occur after ink spotting, and image quality tends to be deteriorated. In contrast, according to the inkjet recording method of the present invention using the ink set for inkjet recording of the present invention, recording of a high-quality image having excellent color density and hue can be achieved while suppressing the migration of the colorant.

For the recording medium, a commercially-available product may be used, and examples thereof include high-quality papers (A) such as PRINCE WOOD FREE (trade name) manufactured by Oji Paper Co., Ltd., SHIRAOI (trade name) manufactured by Nippon Paper Industries Co., Ltd., and New NPI JO-SHITSU (New NPI high-quality; trade name) manufactured by Nippon Paper Industries Co., Ltd.; very light-weight coated papers such as EVER LIGHT COATED (tradename) manufactured by Oji Paper Co., Ltd. and AURORA S (tradename) manufactured by Nippon Paper Industries Co., Ltd.; lightweight coat papers (A3) such as TOPKOTE (L) (tradename) manufactured by Oji Paper Co., Ltd. and AURORA L (tradename) manufactured by Nippon Paper Industries Co., Ltd.; coat papers (A2, B2) such as TOPKOTE PLUS (tradename) manufactured by Oji Paper Co., Ltd. and AURORA COAT (tradename) manufactured by Nippon Paper Industries Co., Ltd.; and art papers (A1) such as 2/SIDE GOLDEN CASK GLOSS (tradename) manufactured by Oji Paper Co., Ltd. and TOKUBISHI ART (tradename) manufactured by Mitsubishi Paper Mills Ltd. As the recording medium, various inkjet-recording papers exclusively for photos may be used.

From the viewpoint of obtaining a high-quality image having more excellent color density and hue than the conventional one while suppressing the migration of the colorant, it is preferred that the recording medium has a water absorption coefficient Ka of from 0.05 to 0.5 mL/m$^2$·ms$^{1/2}$, more preferably from 0.1 to 0.4 mL/m$^2$·ms$^{1/2}$, and still more preferably from 0.2 to 0.3 mL/m$^2$·ms$^{1/2}$.

The water absorption coefficient Ka has the same meanings as described in JAPAN TAPPI paper pulp test method No. 51: 2000 (Published by Paper Pulp Technology Association). Specifically, the absorption coefficient Ka is calculated from the difference between the amount of water transferred at a contact time of 100 ms and the amount of water transferred at a contact time of 900 ms measured by an AUTOMATIC SCANNING LIQUID ABSORPTOMETER KM500WIN (manufactured by KUMAGAI RIKI KOGYO Co., Ltd.).

In the present invention, the amount of the treatment liquid applied and the amount of the aqueous ink applied are preferably adjusted as required. For example, the amount of the treatment liquid applied may be varied depending on the recording medium in order to, for example, adjust the physical properties such as the viscoelasticity of the aggregate formed upon mixing the treatment liquid and the aqueous ink.

According to the present invention, the following aspects are provided. However, the present invention is not limited thereto.

<1> A treatment liquid, which includes: at least one acidic compound selected from an organic acidic compound and an inorganic acidic compound; and at least one compound selected from a nitrogen-containing heterocyclic compound or an organic mercapto compound and which has a pH of from 0.5 to 2.0 at 25° C. and the ability to aggregate particles dispersed in an ink composition including at least one colorant and particles of at least one polymer.

<2> The treatment liquid of item <1>, wherein the organic acidic compound includes an organic carboxylic acid.

<3> The treatment liquid of item <1> or <2>, wherein the treatment liquid includes the organic acidic compound and the inorganic acidic compound in a molar ratio of from 10:1 to 1:10.

<4> The treatment liquid of item <2> or <3>, wherein the organic carboxylic acid includes a divalent or polyvalent carboxylic acid.

<5> The treatment liquid of any one of items <1> to <4>, wherein the at least one acidic compound includes at least two acidic compounds, at least one of the at least two acidic compounds being capable of forming a calcium salt having a solubility of 0.1 g or less in 100 g of water at 25° C. and having a content of from 1 to 70% by mass based on a total weight of the acidic compounds.

<6> The treatment liquid of any one of items <1> to <5>, wherein the pH is in the range of from 0.5 to 1.5.

<7> The treatment liquid of any one of items <1> to <6>, wherein the at least one selected from the nitrogen-containing heterocyclic compound or the organic mercapto compound includes benzotriazole.

<8> The treatment liquid of any one of items <1> to <7>, wherein the treatment liquid further includes a water-soluble organic solvent.

<9> An ink set including: an ink composition including at least one colorant and particles of at least one polymer; and the treatment liquid of any one of items <1> to <8>.

<10> A method for forming an image, including: applying the treatment liquid of any one of items <1> to <8> to a recording medium; and applying an ink composition including at least one colorant and particles of at least one polymer to the recording medium to form an image.

<11> The method of item <10>, wherein application of the treatment liquid is performed by roller coating.

<12> The method of item <10> or <11>, wherein application of the treatment liquid is followed by applying the ink composition.

According to the aspect <1> of the invention, there may be provided a treatment liquid that has excellent coating properties and can form an image having a high level of scratch resistance, dot diameter stability, and feeding properties of the recording medium in the image formation in a long run.

According to the aspect <2> of the invention, there may be provided a treatment liquid that can form an image having excellent aggregation speed or scratch resistance.

According to the aspect <3> of the invention, there may be provided a treatment liquid that can form an image having excellent aggregation speed, scratch resistance, dot diameter stability, or feeding properties of the inkjet recording medium, and can improve unevenness of gloss.

According to the aspect <4> of the invention, there may be provided a treatment liquid that can form an image having excellent aggregation speed, or scratch resistance.

According to the aspect <5> of the invention, there may be provided a treatment liquid that can suppress unevenness of gloss caused on the image section.

According to the aspect <6> of the invention, there may be provided a treatment liquid that can form an image having excellent aggregation speed.

According to the aspect <7> of the invention, there may be provided a treatment liquid that can form an image having excellent dot diameter stability, or feeding properties after image formation in the image formation in a long run.

According to the aspect <8> of the invention, there may be provided a treatment liquid that can form an image having excellent dot diameter stability, or scratch resistance, or can impart a uniform coating surface profile.

According to the aspect <9> of the invention, there may be provided an ink set which includes an ink composition and a treatment liquid which has excellent coating properties and can form an image having a high level of scratch resistance, dot diameter stability, and feeding properties of the recording medium in the image formation in a long run.

According to the aspect <10> of the invention, there may be provided an image forming method that makes it possible to form an image having a high level of scratch resistance, dot diameter stability, and feeding properties of the recording medium in the image formation in a long run.

According to the aspect <11> of the invention, there may be provided an image forming method that can impart excellent coating properties.

According to the aspect <12> of the invention, there may be provided an image forming method that makes it possible to form an image having high density and high resolution even when recording is performed at high speed.

EXAMPLES

In the following, the present invention will be described in further details with reference to examples. However, the present invention is not limited to these examples. Moreover, the term "part" and "%" are based on mass, and "degree of polymerization" refers to an "average degree of polymerization" unless otherwise noted.

Example 1

Preparation of Ink Composition
Preparation of Pigment Composition
Preparation of Polymer Dispersant P-1

88 g of methyl ethyl ketone was put in a 1000 mL three-necked flask equipped with a stirrer and a cooling tube, and was heated to 72° C. in a nitrogen atmosphere, to which a solution of 0.85 g of dimethyl-2,2'-azobisisobutyrate, 60 g of benzyl methacrylate, 10 g of methacrylic acid, and 30 g of methyl methacrylate dissolved in 50 g of methyl ethyl ketone was added dropwise over 3 hours. After completing the dropwise addition and further allowing the mixture to react for 1 hr, a solution in which 0.42 g of dimethyl-2,2'-azobisisobutyrate was dissolved in 2 g of methyl ethyl ketone was added. The resultant mixture liquid was heated to 78° C. and maintained at that temperature for 4 hours. The obtained reaction liquid was re-precipitated twice with a great excess of hexane, and a precipitated resin was dried, thereby obtaining 96 g of a polymer dispersant P-1.

The composition of the obtained resin was confirmed by $^1$H-NMR and the weight average molecular weight (Mw) determined by GPC was 44,600. Further, the acid value of the obtained polymer was determined according to the method described in JIS standards (JISK0070:1992), and was found to be 65.2 mgKOH/g.

Preparation of Cyan Dispersion Liquid 10 parts of Pigment Blue 15:3 (Phthalocyanine blue A220 manufactured by Dainichiseika Color & Chemicals Mfg. Co., Ltd.), 5 parts of the polymer dispersant P-1, 42 parts of methyl ethyl ketone, 5.5 parts of 1N NaOH aqueous solution and 87.2 parts of ion exchanged water were mixed, and the mixture was dispersed by a bead mill using 0.1 mmcp zirconia beads for the period of from 2 to 6 hours.

Methyl ethyl ketone was removed from the resultant dispersion under reduced pressure at 55° C. and a portion of water was also removed from the resultant dispersion. Then, further, the resultant dispersion was centrifuged using High Speed Refrigerated Centrifuge 7550 (manufactured by KUBOTA Corporation) using a 50 mL centrifuge tube at 8000 rpm for 30 minutes to collect the supernatant other than the precipitate. Thereafter, the concentration of the pigment was determined from the absorbance spectrum and a dispersion of resin-coated pigment particles (pigment coated with a polymer dispersant) having a pigment concentration of 10.2% by mass (a cyan dispersion liquid) was obtained.

Preparation of Magenta Dispersion Liquid

A dispersion of resin-coated pigment particles (pigment coated with a polymer dispersant) (a magenta dispersion liquid) was prepared in the same manner as the preparation of the cyan dispersion liquid, except that Pigment Red 122 was used in place of Pigment Blue 15:3 (Phthalocyanine blue-A220 manufactured by Dainichiseika Color & Chemicals Mfg. Co., Ltd.).

Preparation of Yellow Dispersion Liquid

A dispersion of resin-coated pigment particles (pigment coated with a polymer dispersant) (a yellow dispersion liquid) was prepared in the same manner as the preparation of the cyan dispersion liquid, except that a yellow pigment, Pigment Yellow 74, was used in place of the cyan pigment Pigment Blue 15:3.

Preparation of Black Dispersion Liquid

A dispersion of resin-coated pigment particles (pigment coated with a polymer dispersant) (a black dispersion liquid)

was prepared in the same manner as the preparation of the cyan dispersion liquid, except that a carbon black (NIPEX160-IQ manufactured by Degussa Co.) was used in place of the cyan pigment Pigment Blue 15:3.

Preparation of Self-Dispersing Polymer Particles 360.0 g of methyl ethyl ketone was placed in a 2 L three-necked flask equipped with a stirrer, a thermometer, a reflux condenser, and a nitrogen gas introduction tube, and was heated to 75° C. Thereafter, while the temperature inside the flask was maintained at 75° C., a mixture solution of 180.0 g of phenoxyethyl acrylate, 162.0 g of methyl methacrylate, 18.0 g of acrylic acid, 72g of methyl ethyl ketone, and 1.44 g of V-601 (trade name, manufactured by Wako Pure Chemical Industries Ltd.) was added dropwise into the flask at a constant rate such that the dropwise addition was completed in 2 hours. After the dropwise addition was completed, a solution of 0.72 g of V-601 in 36.0 g of methyl ethyl ketone was added into the flask, stirred at 75° C. for 2 hours, and a solution of 0.72 g of V-601 in 36.0 g of isopropanol was further added, and the contents of the flask were stirred at 75° C. for 2 hours. Then, the temperature inside the flask was increased to 85° C., and stirring was continued for another 2 hours. The weight average molecular weight (Mw) of the obtained copolymer was found to be 64,000 (calculated as polystyrene-equivalent value according to gel permeation chromatography (GPC), and columns used were TSKgel Super HZM-H, TSKgel Super HZ4000, and TSKgel Super HZ200, each of which was manufactured by Tosoh Corporation. The acid value of the copolymer was found to be 38.9 (mgKOH/g).

Then, 668.3 g of the polymerization solution was weighed, and 388.3 g of isopropanol and 145.7 ml of a 1 mol/L NaOH aqueous solution were added to the polymerization solution, and then the temperature inside the reaction vessel was elevated to 80° C. Thereafter, 720.1 g of distilled water was added dropwise into the reaction vessel at a rate of 20 ml/min so as to form water dispersion. The contents of the reaction vessel was allowed to stand, under atmospheric pressure, at a reaction vessel inside temperature of 80° C. for 2 hours, and then 85° C. for 2 hours, and then 90° C. for 2 hours. Subsequently, the inside of the reaction vessel was depressurized, and the isopropanol, the methyl ethyl ketone, and the distilled water were removed in a total amount of 913.7 g. As a result, water dispersion (emulsion) of self-dispersing polymer particles B-01 having a solid concentration of 28.0% by mass was obtained.

Preparation of Ink Composition

The resulting pigment dispersion liquid of each color and the resulting self-dispersing polymer fine particles were used, and the respective components of the ink composition (solid content) shown in Table 1 below were mixed to prepare each ink composition. The prepared ink composition was filtered through a 5 μm PVDF filter (trade name: Millex SV, 25 mm in diameter, manufactured by Millipore Corporation) using a plastic disposable syringe, so that a final ink composition was obtained.

Each color ink composition was measured for pH (25° C.) using a pH meter (trade name: WM-50EG, manufactured by DKK-TOA CORPORATION). Each color ink composition was also measured for surface tension at 25° C. using FASE Automatic Surface Tensiometer (trade name: CBVP-Z, manufactured by Kyowa Interface Science Co., LTD). The results are shown in Table 1.

TABLE 1

| Ink Composition | C1 | M1 | Y1 | K1 |
|---|---|---|---|---|
| Cyan Pigment (Pigment dispersion liquid was used) | 4 | | | |
| Magenta Pigment (Pigment dispersion liquid was used) | | 4 | | |
| Yellow Pigment (Pigment dispersion liquid was used) | | | 4 | |
| Black Pigment (Pigment dispersion liquid was used) | | | | 4 |
| Pigment dispersant | 2 | 2 | 2 | 2 |
| SUNNIX GP-250 (Sanyo Chemical Industries, Ltd.) | 10 | 10 | 10 | 10 |
| Tripropylene Glycol Monomethyl Ether | 5 | 5 | 5 | 5 |
| OLFINE E1010 (Nissin Chemical Industry Co., Ltd.) | 1 | 1 | 1 | 1 |
| Self-Dispersing Polymer Particles | 4 | 4 | 4 | 4 |
| Water | 74 | 74 | 74 | 74 |
| pH | 8.7 | 8.6 | 8.4 | 8.5 |
| Surface tension (mN/m) | 34.6 | 35.2 | 35.1 | 34.8 |

The number of each ingredient of the ink composition shown in Table 1 indicates a part by mass.

Formation of Treatment Liquids

Treatment Liquid 1

The materials shown below were mixed to prepare treatment liquid 1.

| | |
|---|---|
| Malonic acid | 25 g |
| Diethylene glycol monoethyl ether | 4 g |
| Tripropylene glycol monomethyl ether | 4 g |
| Ion-exchanged water | balance to 100 g |

As a result of measurement with a pH meter (trade name: WM-50EG, manufactured by DKK-TOA CORPORATION), the pH of treatment liquid 1 was determined to be 1.1. As a result of measurement with FASE Automatic Surface Tensiometer (trade name: CBVP-Z, manufactured by Kyowa Interface Science Co., LTD), the surface tension of treatment liquid 1 was determined to be 43.0 (mN/m).

Preparation of Treatment Liquids 2 to 9, 1-1, 1-2, 1-4, and 1-5

Treatment liquids 2 to 9, 1-1, 1-2, 1-4, and 1-5 were prepared in the same manner as treatment liquid 1, except that 0.1 mol/L of the compound used in the invention shown in Table 2 below was added and that the pH was changed as shown in Table 2.

Image Recording

Image recording was performed under the image recording conditions described below using OK Top Coat (A4 in size, manufactured by Oji paper Co., Ltd.) as a recording medium and the ink composition and the treatment liquid shown above.

The application of the ink was started 1 second after the step of applying the treatment liquid.

Treatment Liquid-Applying Step

Immediately before the ink drawing on the recording medium, the treatment liquid shown in Table 2 was applied in an amount of 1.5 g/m² to the surface of the medium using a coating roller. The coating roller had the structure shown in FIG. 7 of JP-A No. 2009-61645, and an inkjet recording apparatus having the structure shown in FIG. 1 of the same publication was used.

The recording medium coated with the treatment liquid was then dried under the conditions below.

—Treatment Liquid Drying Conditions (Air Blow Drying)—

Blowing rate: 15 m/second

Temperature: Heating from the back side of the recording medium (opposite to the recording surface) with a contact-type flat heater so that the surface of the recording medium could be heated to a temperature of 60° C.
Blowing region: 450 mm (drying time 0.7 seconds)
Ink-Applying Step
Ejecting Method
Four-color, single-pass, image formation was performed under the following condition using the ink compositions: cyan pigment ink C, magenta pigment ink M, yellow pigment ink Y, and black pigment ink K, which were obtained as described above. The ink compositions were ejected in the color order of M-K-C-Y.
Under the following condition, the ink compositions were applied to the recording medium to which the reaction liquid had been applied
Head: 1,200 dpi/20 inch-width piezo full-line heads were installed for four colors.
Amount of Ejection Liquid Droplets: 2.4 µL
Drive Frequency: 30 kHz (conveyance speed of recording medium: 635 mm/sec)
Herein, a simple color dot drawing or two-color-superimposed dot drawing was conducted.
Next, the recording medium provided with the ink composition was dried under the following condition.
Drying Condition for Ink (Blow Dry)
Blow speed: 15 m/s
Temperature: The recording medium was heated by a contact-type flat heater from the backside of the recording side such that the surface temperature of the recording medium reached 60° C.
Blowing area: 640 mm (Drying time: 1 second)
Subsequently, a heat fixation process was performed under the following conditions.
—Fixation—
Silicone rubber rollers (hardness: 50°, nip width: 5 mm)
Roller temperature: 90° C.
Pressure: 0.8 MPa
Evaluation
After 500 sheets of drawing, they were left as they were for 24 hours, and then 500 sheets of drawing were performed again in the same manner. Subsequently, they were subjected to each evaluation described below.
1. Evaluation of Treatment Liquid-Coated Surface Profile
A coloring liquid was prepared by adding 1 g of the magenta pigment ink Ml to 100 g of the treatment liquid prepared as described above. The coloring liquid was applied to the recording medium, and the coating surface profile was visually observed. The application conditions were the same as those for the above treatment liquid applying step.

Evaluation Criteria
A: The surface is entirely uniform with no color density unevenness.
B: The surface slightly has a stripe-like pattern of light and dark but is uniform as a whole at a practically acceptable level.
C: The surface has a stripe-like pattern of light and dark and partially cissing-like unevenness and is practically unacceptable.
2. Occurrence of Scratches (Scratch Resistance)
The samples prepared by the drawing were visually evaluated for scratches occurring in the feed direction.
Evaluation Criteria
A: No scratch occurs.
B: Scratches are slightly formed at an acceptable level, and the image is not damaged.
C: Very thin scratches are formed at an allowable level.
D: Clear scratches are formed at a practically unacceptable level.
3. Dot Uniformity
Concerning the secondary color dots, the uniformity of cyan dots (secondary color dots) deposited on a magenta solid image was observed using Dot Analyzer DA-6000 manufactured by Oji Scientific Instruments.
Evaluation Criteria
A: The dots are entirely uniform in size and shape at a satisfactory level.
B: As a result of careful observation, the dots are slightly uneven in size depending on location, but are at a good level as a whole.
C: The dots are uneven in size to a small extent depending on location, and slightly missing dots are observed in a few cases, which correspond to a practically lower limit level.
D: The dots are uneven in size depending on location, and non-circular dots are clearly observed in various places at a practically problematic level.
4. Uneven Gloss
A magenta and black (secondary color) solid image was formed. A finger-touch test was performed on the image, and the resultant finger mark thereon was visually evaluated for uneven gloss.
Evaluation Criteria
A: Uneven gloss is not observed.
B: Uneven gloss slightly occurs at a practically acceptable level.
B': Uneven gloss occurs at a practically allowable level.
C: Uneven gloss clearly occurs at a practically problematic level in the finger mark.

TABLE 2

| Treatment liquid No. | Compound used in the invention | | Acidic compound | | | Coating | | | | Remark |
|---|---|---|---|---|---|---|---|---|---|---|
| | Kind | Content mol/L | Kind | Content mol/L | pH | surface profile | Occurrence of scratches | Dot uniformity | Uneven gloss | |
| 1 | Absent | 0 | Malonic acid | 0.24 | 1.1 | B | C | C | C | Comparative example |
| 2 | BT | 0.1 | Malonic acid | 0.24 | 1.1 | A | A | B | B' | Invention |
| 3 | MBT | 0.1 | Malonic acid | 0.24 | 1.1 | A | A | B | B' | Invention |
| 4 | ABT | 0.1 | Malonic acid | 0.24 | 1.1 | A | B | B | B' | Invention |
| 5 | CBT | 0.1 | Malonic acid | 0.24 | 1.1 | A | B | B | B' | Invention |
| 6 | TT | 0.1 | Malonic acid | 0.24 | 1.1 | A | B | B | B' | Invention |

TABLE 2-continued

| Treatment liquid No. | Compound used in the invention Kind | Content mol/L | Acidic compound Kind | Content mol/L | pH | Coating surface profile | Occurrence of scratches | Dot uniformity | Uneven gloss | Remark |
|---|---|---|---|---|---|---|---|---|---|---|
| 7 | ATT | 0.1 | Malonic acid | 0.24 | 1.1 | A | B | B | B' | Invention |
| 8 | MTT | 0.1 | Malonic acid | 0.24 | 1.1 | A | B | B | B' | Invention |
| 9 | PTT | 0.1 | Malonic acid | 0.24 | 1.1 | A | B | B | B' | Invention |
| 1-1 | PMT | 0.1 | Malonic acid | 0.24 | 1.1 | A | B | B | B' | Invention |
| 1-2 | p-toluenesulfonic acid | 0.1 | Malonic acid | 0.24 | 0.9 | B | C | C | C | Comparative example |
| 1-4 | BT | 0.1 | Nitric acid | 0.24 | 0.48 | C | C | D | C | Comparative example |
| 1-5 | BT | 0.1 | Malonic acid | 0.08 | 2.1 | C | B | D | C | Comparative example |

"The compounds used in the invention" that are used in the examples and shown in the tables are specified below.
BT: benzotriazole
MBT: 5-methylbenzotriazole
ABT: 5-aminobenzotriazole
CBT: 5-chlorobenzotriazole
TT: tetrazole
ATT: 5-aminotetrazole
MTT: 5-methyltetrazole
PTT: 5-phenyltetrazole
PMT: 2-phenyl-1-mercaptotetrazole As is evident from Table 2, the treatment liquids according to the invention that were prepared with "the compounds used in the invention" show good results as a whole, while treatment liquid 1 according to the comparative example that were prepared without "the compound used in the invention" does not show a good result as a whole.

Preparation of Treatment Liquids 2-1 to 2-4 and Treatment Liquids 3-1 to 3-4

Treatment liquids 2-1 to 2-4 and Treatment Liquids 3-1 to 3-4 were prepared and evaluated in the same manner as the treatment liquids 2 and 3, except that the treatment and 3 were each modified as shown in Table 3 with respect to the content (addition amount) of "the compound used in the invention".

TABLE 3

| Reaction liquid No | Compound used in the invention Kind | Content mol/L | Acidic compound Kind | Content mol/L | pH | Coating surface profile | Occurrence of scratches | Dot uniformity | Uneven gloss | Remark |
|---|---|---|---|---|---|---|---|---|---|---|
| 2 | BT | 0.1 | Malonic acid | 0.24 | 1.1 | A | A | B | B' | Invention |
| 2-1 | BT | 0.005 | Malonic acid | 0.24 | 1.1 | B | B | B | B' | Invention |
| 2-2 | BT | 0.05 | Malonic acid | 0.24 | 1.1 | A | A | B | B' | Invention |
| 2-3 | BT | 0.3 | Malonic acid | 0.24 | 1.1 | A | A | B | B' | Invention |
| 2-4 | BT | 0.6 | Malonic acid | 0.24 | 1.1 | B | A | B | B' | Invention |
| 3 | MBT | 0.1 | Malonic acid | 0.24 | 1.1 | A | A | B | B' | Invention |
| 3-1 | MBT | 0.005 | Malonic acid | 0.24 | 1.1 | B | B | B | B' | Invention |
| 3-2 | MBT | 0.05 | Malonic acid | 0.24 | 1.1 | A | B | B | B' | Invention |
| 3-3 | MBT | 0.3 | Malonic acid | 0.24 | 1.1 | B | A | B | B' | Invention |
| 3-4 | MBT | 0.6 | Malonic acid | 0.24 | 1.1 | B | A | B | B' | Invention |
| 1 | Absent | 0 | Malonic acid | 0.24 | 1.1 | B | C | C | C | Comparative example |

From Table 3, it is seen that among the treatment liquids according to the invention, the treatment liquid prepared with benzotriazole is less dependent on the content (addition amount) and more preferred than the treatment liquid prepared with 5-methylbenzotriazole.

Preparation of Treatment Liquids 10 to 26

Treatment liquids 10 to 26 were prepared and evaluated in the same manner as the treatment liquids 1 and 2, except that the treatment liquids 1 and 2 were each modified as shown in Table 4 with respect to the kind of "the compound used in the invention", the kind and content (addition amount) of the acidic compound, and pH. The pH of each of treatment liquids 1, 2 and 10 to 26 was in the range of from 0.5 to 1.5.

TABLE 4

| Treatment liquid No | Compound used in the invention | Acidic compound Kind | Addition amount (g) | mol/L | Molar ratio of organic acid compound to inorganic acidic compound (O:I) | Ca salt solubility | Ratio of (mass %) of acidic compound capable of forming Ca salt with a solubility of 0.1 or less based on all acidic compounds | pH | Coating surface profile | Occurrence of scratches | Dot uniformity | Uneven gloss | Remark |
|---|---|---|---|---|---|---|---|---|---|---|---|---|---|
| 1 | Absent | Malonic acid | 25 | 0.24 | 0.24:0 | 0.35 | — | 1.1 | B | C | C | C | Comparative example |
| 2 | BT | Malonic acid | 25 | 0.24 | 0.24:0 | 0.35 | — | 1.1 | A | A | B | B' | Invention |
| 10 | Absent | DL-malic acid | 25 | 0.19 | 0.19:0 | 0.92 | — | 1.7 | B | C | C | C | Comparative example |
| 11 | Absent | Phosphoric acid | 25 | 0.26 | 0:0.26 | 0.0018 | — | 0.6 | B | D | D | B | Comparative example |
| 12 | Absent | L-tartaric acid | 25 | 0.17 | 0.17:0 | 0.0023 | — | 1.3 | B | C | D | B | Comparative example |
| 13 | BT | DL-malic acid | 25 | 0.19 | 0.19:0 | 0.92 | — | 17 | A | A | B | B' | Invention |
| 14 | BT | Phosphoric acid | 25 | 0.26 | 0:0.26 | 0.0018 | — | 0.6 | A | B | B | A | Invention |
| 15 | BT | L-tartaric acid | 25 | 0.17 | 0.17:0 | 0.0023 | — | 1.3 | A | B | B | A | Invention |
| 16 | BT | Malonic acid | 10 | 0.10 | 0.17:0 | 0.35 | — | 1.3 | A | A | B | B' | Invention |
|  |  | DL-malic acid | 10 | 0.07 |  | 0.92 | — |  |  |  |  |  |  |
| 17 | BT | Malonic acid | 10 | 0.10 | 1:1 | 0.35 | — | 0.9 | A | A | A | A | Invention |
|  |  | Phosphoric acid | 10 | 0.10 |  | 0.0018 | 50 |  |  |  |  |  |  |
| 18 | BT | Malonic acid | 15 | 0.14 | 2.8:1 | 0.35 | — | 1 | A | A | A | A | Invention |
|  |  | Phosphoric acid | 5 | 0.05 |  | 0.0018 | 25 |  |  |  |  |  |  |
| 19 | BT | Malonic acid | 10 | 0.10 | 5:1 | 0.35 | — | 1.1 | A | A | A | A | Invention |
|  |  | DL-malic acid | 7 | 0.05 |  | 0.92 | — |  |  |  |  |  |  |
|  |  | Phosphoric acid | 3 | 0.03 |  | 0.0018 | 15 |  |  |  |  |  |  |
| 20 | BT | Malonic acid | 10 | 0.10 | 8.5:1 | 0.35 | — | 1.1 | A | A | A | A | Invention |
|  |  | DL-malic acid | 10 | 0.07 |  | 0.92 | — |  |  |  |  |  |  |
|  |  | Phosphoric acid | 2 | 0.02 |  | 0.0018 | 9 |  |  |  |  |  |  |
| 21 | BT | Malonic acid | 20 | 0.19 | 19:1 | 0.35 | — | 1.2 | A | A | A | A | Invention |
|  |  | Phosphoric acid | 1 | 0.01 |  | 0.0018 | 70 |  |  |  |  |  |  |
| 22 | BT | Malonic acid | 15 | 0.14 | 0.17:0 | 0.35 | — | 1.3 | A | A | B | A | Invention |
|  |  | L-tartaric acid | 5 | 0.03 |  | 0.0023 | 25 |  |  |  |  |  |  |
| 23 | BT | Malonic acid | 15 | 0.14 | 0.17:0 | 0.35 | — | 1.3 | A | A | B | B | Invention |
|  |  | Citric acid | 5 | 0.03 |  | 0.085 | 25 |  |  |  |  |  |  |
| 24 | BT | Malonic acid | 6 | 0.06 | 1:2.3 | 0.35 | — | 0.8 | A | A | A | A | Invention |
|  |  | Phosphoric acid | 14 | 0.14 |  | 0.0018 | 70 |  |  |  |  |  |  |
| 25 | BT | Malonic acid | 2 | 0.02 | 1:9 | 0.35 | — | 0.6 | A | A | B | A | Invention |
|  |  | Phosphoric acid | 18 | 0.18 |  | 0.0018 | 90 |  |  |  |  |  |  |
| 26 | BT | Acetic acid | 35 | 0.58 | 0.58:0 | 35 | — | 2 | B | B | B | B' | Invention |

As is apparent from Table 4, it is seen that according to an exemplary embodiment of the invention, the combination use of the organic acidic compound and the inorganic acidic compound in a ratio of 10:1 to 1:10 makes it possible to further increase the dot uniformity, and that the uneven gloss can be further reduced when an acidic compound capable of forming a calcium salt with a solubility of 0.1 or less is added in an amount of 1% or more. In contrast, when an acidic compound capable of forming a calcium salt with a solubility of 0.1 or less is added in an amount of more than 70%, the dot stability tends to be reduced.

Preparation of Treatment Liquids 27 to 32

Treatment liquids 27 to 32 were prepared and evaluated in the same manner as the treatment liquids 1 and 18, except that the kind and content (addition amount: % by mass based on a total amount of the treatment liquid) of the water-soluble organic solvent in the treatment liquids 1 and 18 were changed as shown in Table 5 below.

TABLE 5

| Treatment liquid No | Compound used in the invention Kind | Content mol/L | Acidic compound Kind | Content mol/L | Water-soluble organic solvent | Water-soluble organic solvent content | pH | Coating surface profile | Occurrence of scratches | Dot uniformity | Uneven gloss | Remark |
|---|---|---|---|---|---|---|---|---|---|---|---|---|
| 27 | Absent | 0 | Malonic acid | 0.14 | DEGmBE | 4 | 1.0 | B | C | B | B | Comparative example |
|  |  |  | Phosphoric acid | 0.05 | TPGmME | 4 |  |  |  |  |  |  |
| 18 | BT | 0.1 | Malonic acid | 0.14 | DEGmBE | 4 | 1.0 | A | A | A | A | Invention |
|  |  |  | Phosphoric acid | 0.05 | TPGmME | 4 |  |  |  |  |  |  |
| 28 | Absent | 0 | Malonic acid | 0.14 | DEGmBE | 4 | 1.0 | B | C | B | B | Comparative example |
|  |  |  | Phosphoric acid | 0.05 | DPG | 4 |  |  |  |  |  |  |
| 29 | Absent | 0 | Malonic acid | 0.14 | DEGmBE | 2 | 1.0 | B | C | B | B | Comparative example |
|  |  |  | Phosphoric acid | 0.05 | GP250 | 8 |  |  |  |  |  |  |
| 30 | BT | 0.1 | Malonic acid | 0.14 | DEGmBE | 4 | 1.0 | A | A | A | A | Invention |
|  |  |  | Phosphoric acid | 0.05 | DPG | 4 |  |  |  |  |  |  |
| 31 | BT | 0.1 | Malonic acid | 0.14 | DEGmBE | 2 | 1.0 | A | A | A | A | Invention |
|  |  |  | Phosphoric acid | 0.05 | GP250 | 8 |  |  |  |  |  |  |
| 32 | BT | 0.1 | Malonic acid | 0.14 | DEGmBE | 4 | 1.0 | A | A | A | A | Invention |
|  |  |  | Phosphoric acid | 0.05 | GP250 | 8 |  |  |  |  |  |  |

The abbreviations shown in the table for the types of the water-soluble organic solvents used in the examples are as follows.
DEGmBE: diethylene glycol monobutyl ether
DEGmEE: diethylene glycol monoethyl ether
DPG: dipropylene glycol
TPGmME: tripropylene glycol monomethyl ether
GP-250: polyoxypropylene glyceryl ether (trade name: NEWPOL GP-250 manufactured by Sanyo Chemical Industries, Ltd.)

As apparent from Table 5, it is seen that even though the kind of the water-soluble organic solvent used in the invention is changed, the advantageous effects of the invention can also be obtained.

All publications, patent applications, and technical standards mentioned in this specification are herein incorporated by reference to the same extent as if each individual publication, patent applications, and technical standards was specifically and individually indicated to be incorporated by reference.

What is claimed is:

1. A treatment liquid comprising at least one acidic compound selected from an organic acidic compound or an inorganic acidic compound; and at least one compound selected from a nitrogen-containing heterocyclic compound or an organic mercapto compound;
   wherein the treatment liquid has a pH of from 0.5 to 2.0 at 25° C. and the ability to aggregate particles dispersed in an ink composition comprising at least one colorant and particles of at least one polymer.

2. The treatment liquid according to claim 1, wherein the organic acidic compound comprises an organic carboxylic acid.

3. The treatment liquid according to claim 1, wherein the treatment liquid comprises the organic acidic compound and the inorganic acidic compound in a molar ratio of from 10:1 to 1:10.

4. The treatment liquid according to claim 2, wherein the organic carboxylic acid comprises a divalent or polyvalent carboxylic acid.

5. The treatment liquid according to claim 1, wherein the at least one acidic compound comprises at least two acidic compounds, at least one of the at least two acidic compounds being capable of forming a calcium salt having a solubility of 0.1 g or less in 100 g of water at 25° C. and having a content of from 1 to 70% by mass based on a total weight of the acidic compounds.

6. The treatment liquid according to claim 1, wherein the pH is in the range of from 0.5 to 1.5.

7. The treatment liquid according to claim 1, wherein the at least one selected from the nitrogen-containing heterocyclic compound or the organic mercapto compound comprises benzotriazole.

8. The treatment liquid according to claim 1, wherein the treatment liquid further comprises a water-soluble organic solvent.

9. An ink set comprising: an ink composition comprising at least one colorant and particles of at least one polymer; and the treatment liquid according to claim 1.

10. A method for forming an image, comprising:
applying the treatment liquid according to claim 1 to a recording medium; and
applying an ink composition comprising at least one colorant and particles of at least one polymer to the recording medium to form an image.

11. The method according to claim 10, wherein application of the treatment liquid is performed by roller coating.

12. The method according to claim 10, wherein application of the treatment liquid is followed by applying the ink composition.

* * * * *